United States Patent [19]

Okada et al.

[11] Patent Number: 5,367,314
[45] Date of Patent: Nov. 22, 1994

[54] DRIVE CIRCUIT FOR A DISPLAY APPARATUS

[75] Inventors: Hisao Okada, Ikoma; Kuniaki Tanaka, Nara, both of Japan

[73] Assignee: Sharp Kabushiki Kaisha, Osaka, Japan

[21] Appl. No.: 766,724

[22] Filed: Sep. 27, 1991

[30] Foreign Application Priority Data

Sep. 28, 1990 [JP] Japan ................... 2-261473

[51] Int. Cl.$^5$ .............................................. G09G 3/36
[52] U.S. Cl. ..................................... 345/100; 345/98
[58] Field of Search ............... 340/784 B, 784 E, 784, 340/789, 793, 719, 718; 358/236, 59; 307/268, 269, 243; 345/100, 204, 94, 87, 98, 208

[56] References Cited

U.S. PATENT DOCUMENTS

| | | | |
|---|---|---|---|
| 4,090,219 | 5/1978 | Ernstoff et al. | 358/59 |
| 4,694,349 | 9/1987 | Takeda et al. | 358/236 |
| 4,781,437 | 11/1988 | Shields et al. | 340/784 |
| 4,799,057 | 1/1989 | Takeda et al. | 340/784 |
| 4,965,566 | 10/1990 | Kawamura et al. | 340/811 |
| 5,040,874 | 8/1991 | Fukuda | 340/784 |
| 5,061,920 | 10/1991 | Nelson | 340/784 |
| 5,070,255 | 12/1991 | Shin | 340/784 |
| 5,101,116 | 3/1992 | Morokawa | 340/811 |
| 5,111,195 | 5/1992 | Fukuoka et al. | 340/784 |
| 5,115,232 | 5/1992 | Iizuka | 340/811 |

*Primary Examiner*—Tommy P. Chin
*Assistant Examiner*—A Au
*Attorney, Agent, or Firm*—David G. Conlin; George W. Neuner

[57] ABSTRACT

A drive circuit for a display apparatus having parallel signal electrodes has at least one voltage selecting circuit, a plurality of signal voltage circuits, one selection signal circuit, and one control signal circuit. The voltage selecting circuit selects one of voltages having different levels in accordance with an input digital video signal. The signal voltage circuits are respectively provided for the signal electrodes, and include two signal lines which are disposed between the voltage selecting circuit and the respective signal electrode. Each of the two signal lines is provided with a input switch, a capacitor and an output switch. The selection signal circuit generates a signal for controlling the two input switches of one of the signal voltage circuits to alternatingly receive a selected voltage from the voltage selecting circuit. The control signal circuit controls the two output switches of the one signal voltage circuit to alternatingly output the voltages toward the respective signal electrode, in an inverted manner with respect to the control of the selection signal circuit.

7 Claims, 20 Drawing Sheets

DRIVE CIRCUIT FOR A DISPLAY APPARATUS

BACKGROUND OF THE INVENTION

1. Field of the Invention

This invention relates to a drive circuit for a display apparatus, and more particularly to a drive circuit for a display apparatus which is capable of gray-scale display by means of amplitude modulation. In this specification, a matrix type liquid crystal display apparatus will be described as a typical example of a display apparatus, but this invention can also be applied to drive circuits for other types of display apparatus such as electroluminescent (EL) display apparatus and plasma display apparatus.

2. Description of the Prior Art

When driving a liquid crystal display (LCD) apparatus, since the speed of response of a liquid crystal is very slow as compared with a luminescent material used in a cathode ray tube (CRT) display apparatus, a special drive circuit is used. That is, in a drive circuit for an LCD apparatus, video signals which are sequentially sent are not immediately supplied to respective pixels, but the video signals are sampled for each of the respective pixels in one horizontal period and held for the horizontal period. The held video signals are output at the same time at the beginning of the next horizontal period, or at an appropriate point of time in the next horizontal period. After the output of video signal voltages to the respective pixels are begun, the signal voltages are held for a period of time sufficiently over the speed of response of the liquid crystal.

In order to hold the signal voltages, a prior art drive circuit utilizes capacitors. FIG. 16 shows a signal voltage output circuit (a source driver) for supplying drive voltages to a plurality of pixels (in this case, 120 pixels) on one scanning line selected by a scanning signal. A portion for the nth pixel of the source driver is shown in FIG. 17. The portion includes an analog switch $SW_1$, an analog sampling capacitor $C_{SMP}$, an analog switch $SW_2$, a holding capacitor $C_H$, and an output buffer amplifier A. The operation of the signal voltage output in the prior art will be described with reference to the circuit diagrams of FIGS. 16 and 17, and also to the signal timing chart of FIG. 18. Analog video signals $v_s$ to be input to the analog switches $SW_1$ are sequentially sampled in accordance with sampling clock signals $T_{SMP1}$-$T_{SMP120}$ which correspond to the respective 120 pixels on one scanning line selected by each horizontal synchronizing signal $H_{syn}$. By this sampling, the sequential instantaneous voltages $V_{SMP1}$-$V_{SMP120}$ of the video signals $v_s$ are applied to the corresponding sampling capacitors $C_{SMP}$. The nth sampling capacitor $C_{SMP}$ is charged up to the value of the video signal voltage $V_{SMPn}$ corresponding to the nth pixel, and holds this value. The signal voltages $V_{SMP1}$-$V_{SMP120}$ which are sequentially sampled and held in one horizontal period are transferred from the sampling capacitors $C_{SMP}$ to the holding capacitors $C_H$ for holding outputs, in response to an output pulse OE which is supplied to all of the analog switches $SW_2$ at the same time. Then the signal voltages $V_{SMP1}$-$V_{SMP120}$ are output to source lines $O_1$-$O_{120}$ connected to the respective pixels through the buffer amplifiers A.

To the drive circuit described above, analog video signals are supplied. Such a drive circuit presents the following problems (A1) and (A2) when attempts are made to increase the size or improve the resolution of a liquid crystal panel.

(A1) When the charges in the sampling capacitors $C_{SMP}$ are transferred to the holding capacitors $C_H$, the relationship between the voltage $V_H$ of the holding capacitor $C_H$ and the sampled voltage $V_{SMP}$ (the voltage of the sampling capacitor $C_{SMP}$) is represented by expression (1) as follows:

$$V_H = \frac{1}{1 + \frac{C_H}{C_{SMP}}} \cdot V_{SMP} \tag{1}$$

Accordingly, in order that the voltage $V_H$ held by the holding capacitor $C_H$ is substantially equal to the sampled voltage $V_{SMP}$, a condition of $C_{SMP} >> C_H$ is required to be satisfied. That is, it is necessary to use the sampling capacitor $C_{SMP}$ of a large capacitance. However, if the capacitance of the sampling capacitor $C_{SMP}$ is too large, it is necessary to make the time for charging (i.e. a sampling period) longer. On the contrary, as the size of the LCD apparatus is made larger or the resolution is improved, the number of pixels corresponding to one horizontal period increases, thereby necessitating a sampling period to be shortened in reverse proportion. It can be seen that there is a limit to the increase in size or the improvement in resolution of the LCD apparatus.

(A2) In the drive circuit for e matrix type display apparatus, unlike the display in a CRT, analog video signals are sampled in accordance with a clock signal and displayed in pixels arranged in a matrix. At this time, since delays of signals in the drive circuit including delays in the bus lines is unavoidable, it is extremely difficult to accurately establish the sampling position for the analog video signals. Particularly, when displaying a computer graphic image in which the relationship between video signals and pixel addresses should be precisely defined, shift in the image display position, bleeding of the image, etc., due to signal delays in the drive system and deterioration of the frequency characteristics cause significant problems.

These problems which occur when using analog video signals are solved by using digital data as video signals. When video signals are supplied in the form of digital data, a drive circuit shown in FIGS. 19 and 20 is used. For the sake of simplicity, the video signal data is composed of 2 bits ($D_0$, $D_1$). That video signal data have four values 0-3, and a signal voltage applied to each pixel is any one of four levels $V_0$-$V_3$. FIG. 19 ks a circuit diagram showing a digital source driver circuit corresponding to the analog source driver circuit shown in FIG. 16. The circuit diagram of FIG. 19 shows the entire source driver for supplying driving voltages to 120 pixels similar to that shown in FIG. 16. FIG. 20 shows a portion for the nth pixel in the circuit. The portion of the circuit comprises a D-type flip-flop (sampling memory) $M_{SMP}$ at a first stage and a flip-flop (holding memory) $M_H$ at a second stage which ere provided for the respective bits ($D_0$, $D_1$) of the video signal data, a decoder DEC, and analog switches $ASW_0$-$ASW_3$ each of which is provided between corresponding one of four external voltage sources $V_0$-$V_3$ and a source line $O_n$. For the sampling of digital video signal data, various circuits may be used other than the D-type flip-flop.

The digital source driver operates as follows. The video signal data ($D_0$, $D_1$) are sampled at the rising of a sampling pulse $T_{SMPn}$ corresponding to the nth pixel, by the sampling memory $M_{SMP}$. At the time when the sampling for one horizontal period is completed, an output pulse OE is fed to the holding memories $M_H$. All the video signal data ($D_0$, $D_1$) held in the holding memories $M_H$ are simultaneously output to the respective decoders DEC. Each of the decoder DEC decodes the 2-bit video signal data ($D_0$, $D_1$). In accordance with the values (0 to 3), one of the analog switches ASW-$_0$–ASW$_3$ is conductive, and the corresponding one of the four external voltages $V_0$–$V_3$ is output to the source line $O_n$.

The source driver in which digital video signals are used for sampling can solve the problems (A1) and (A2) which arise when analog video signals are used for sampling. However, this source driver still has the following problems (D1) and (D2) to be solved.

(D1) With the increase in number of bits of digital video signal data, the size of each of memory cells, decoders, etc., constituting a drive circuit is drastically enlarged. Therefore, the size of a chip and the production cost are greatly increased.

(D2) When voltage sources supplied externally ($V_0$–$V_3$ in FIGS. 19 and 20) are selected by using analog switches, the selected voltage source is directly connected to a source line of the liquid crystal panel and drives the source line. Accordingly, the circuit is required to have a performance capable of sufficiently driving the heavy load, i.e. the liquid crystal panel. This causes the production cost to increase. Especially, in the case where the number of gray-scale levels for image display is increased so that the number of bits of video signal data is increased, in the circuit of FIG. 19 (or FIG. 20), the required number of external voltage sources is increased by a power of 2. For example, when the video signal data is composed of 2 bits as in the circuit of FIG. 19 (or FIG. 20), the number of the external voltage source levels is $2^2=4$. For 3-bit video signal data, the number of levels is $2^3=8$, and for 4-bit, the number of levels is $2^4=16$. In this manner, the number of levels is drastically increased. As mentioned above, when the number of external voltage sources is drastically increased with the increase in number of data bits, and moreover, each of the external voltage sources must drive the above-mentioned heavy load, the source device for the drive circuit becomes enormous.

SUMMARY OF THE INVENTION

The drive circuit of this invention, which overcomes the above-discussed and numerous other disadvantages and deficiencies of the prior art, is used for a display apparatus into which a digital video signal is input and in which a plurality of parallel signal electrodes are provided, and comprises: voltage supplying means for supplying a plurality of signal voltages, the levels of said signal voltages being different; voltage selecting means, connected to said voltage supplying means, for receiving said digital video signal, for selecting one of said signal voltages in accordance with said digital video signal, and for supplying said selected signal voltage; signal voltage means provided for each of said signal electrodes, and having a plurality of signal lines for receiving signal voltages from said voltage selecting means, each of said signal lines being provided with a signal input switching element, a signal holding capacitor and a signal output switching element; selection signal generating means for generating selection signals by which a phase where said voltages from said voltage selecting means are sequentially accepted and another phase where said voltages are not accepted at all are alternately repeated, said selection signal generating means being connected to said signal input switching elements of said plurality of signal lines in each of said signal voltage means, respectively; and control signal generating means for generating control signals by which a phase where said voltages are output to said signal electrodes and another phase where said voltages are not output are alternately repeated, said control signals being inverted from said selection signals, said control signal generating means being connected to said signal output switching elements of said plurality of signal lines in each of said signal voltage means, respectively.

In preferred embodiments, said drive circuit comprises a predetermined number of said voltage selecting means, and each of said voltage selecting means is connected to said signal voltage means corresponding to signal electrodes at every said predetermined number, and said selection signal generating means generates selection signals by which said signal input switching elements are closed for a period which continues said predetermined number of times as long as the duration of said digital video signal.

Preferably, said signal holding capacitor is connected between said signal input switching element and said signal output switching element.

The invention is accomplished in view of the above-mentioned present state. The objective of the invention is to provide a drive circuit for a display apparatus which can solve the disadvantages (A1) and (A2) in analog sampling, and moreover eliminate the problems (D1) and (D2).

In a first phase, in response to a selection signal input from the selection signal generating means to each of the input switching elements, in the signal voltage means, a signal voltage sent from the voltage selecting means is accepted by one signal line and held in the signal holding capacitor, while the other signal line does not accept the signal voltage. On the other hand, in response to a control signal input from the control signal generating means to one of the output switching elements, a signal is not output to a signal electrode from the one signal line which receives the signal voltage, but a signal is output to the signal electrode from the other signal line which has already received and held a signal voltage. In a second phase after completing the first phase, the operation is performed in the inverse manner with respect to the first phase. In each signal voltage supplying means, the one signal line does not accept the signal voltage but outputs the signal voltage which has been received and held in the first phase to the signal electrode. The other signal line receives a signal voltage from the voltage selecting means and holds it, but does not output it to the signal electrode. Thereafter, the first and second phases are repeated.

BRIEF DESCRIPTION OF THE DRAWINGS

This invention may be better understood and its numerous objects and advantages will become apparent to those skilled in the art by reference to the accompanying drawings as follows:

FIGS. 6-1, 6-2, and 6-3 are timing charts illustrating the operation for a longer period of the source driver of the second embodiment.

DESCRIPTION OF THE PREFERRED EMBODIMENTS

Figure 1:
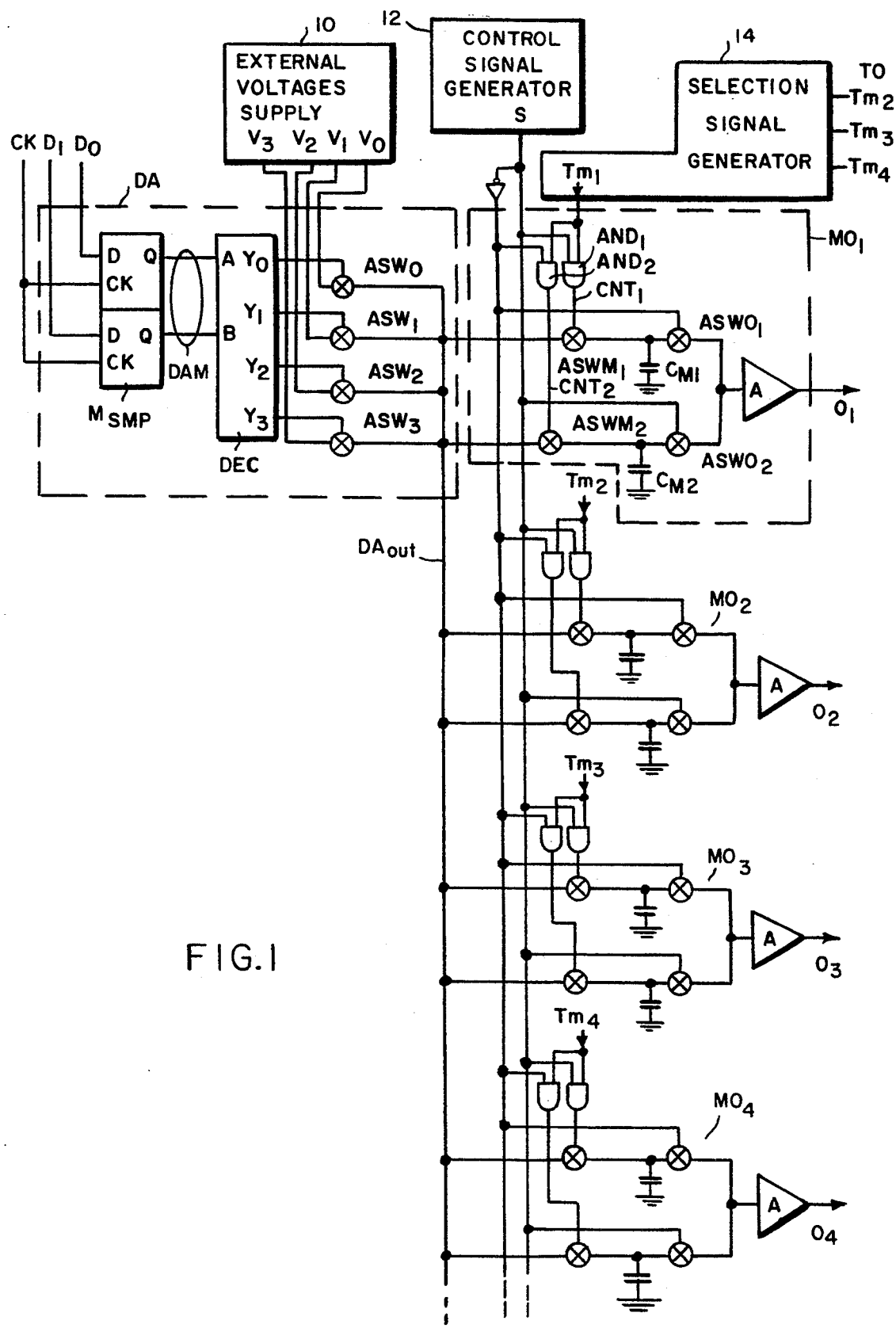
FIG. 1 is a circuit diagram showing a source driver for an LCD apparatus in one embodiment of the invention.

FIG. 1 shows a signal voltage output circuit (a source driver) for supplying signal voltages to a plurality of signal lines (source lines) in a drive circuit for a matrix type LCD apparatus in one embodiment of the invention. In this embodiment, for the sake of simplicity, 2-bit video signal data are used and the number of source lines assigned to the source driver is 120. The source driver of FIG. 1 comprises a circuit (hereinafter, this circuit is referred to as "a DA circuit") provided for 120 pixels on one scanning line and for selecting one of plural external voltages in accordance with digital video signal data, and signal voltage hold circuits $MO_i$ (i is 1 to 120) provided for the respective pixels (120 pixels). In the DA circuit the 2-bit video signal data of $D_0$ and $D_1$ is sampled by a sampling memory $M_{SMP}$ and input into a decoder DEC. The sampling memory $M_{SMP}$ includes two D-type flip-flops corresponding to the respective bits of the input data. In accordance with the video signal date ($D_0$, $D_1$) input into the decoder DEC through input terminals a and B thereof, the decoder DEC outputs an ON-control signal to one of analog switches $ASW_0$–$ASW_3$ through the corresponding one of four output terminals $Y_0$–$Y_3$. External voltage sources $V_0$–$V_3$ (designated by the reference label 10) are connected to terminals of the analog switches $ASW_0$–$ASW_3$, respectively. The other terminals of the analog switches are connected to two analog switches $ASWM_1$ and $ASWM_2$ in the input portion of each of the signal voltage hold circuits $MO_i$ (i is 1 to 120).

Next, the configuration of each of the signal voltage hold circuits $MO_i$ will be described. Two output lines from the DA circuit (the outputs thereof are always the same) are connected to two signal lines in a signal voltage hold circuit $MO_i$. These same outputs are independently processed in parallel. To the two signal lines, are connected in series input analog switches $ASWM_1$ and $ASWM_2$, and output analog switches $ASWO_1$ end $ASWO_2$, respectively. Between each of the output-side terminals of the input analog switches $ASWM_1$ and $ASWM_2$ and the ground, a Corresponding one of capacitors $C_{M1}$ and $C_{M2}$ for holding signal voltages is connected. The two signal lines are connected to each other to constitute one line which is then connected to a source line $O_i$ via a buffer amplifier A.

The ON-control of the four analog switches $ASWM_1$, $ASWM_2$, $ASWO_1$ and $ASWO_2$ in each output voltage hold circuit $MO_i$ will be described. Into the control terminal of one input analog switch $ASWM_1$ (of a first signal line), the output $CNT_1$ of an AND circuit $AND_1$ is input. An external control signal S and a selection pulse $Tm_i$ are supplied (via supplies 12 and 14 respectively) to the inputs of the AND circuit $AND_1$. Into the control terminal of the other input analog switch $ASWM_2$ (of a second signal line), the output $CNT_2$ of an AND circuit $AND_2$ is input. The inverted signal $S_{INV}$ of the control signal S and the selection pulse $Tm_i$ ere supplied to the inputs of the AND circuit AND2. The control terminal of the output analog switch $ASWO_2$ of the second signal line receives the external control signal S directly. The control terminal of the output analog switch $ASWO_1$ of the first signal line receives the inverted signal $S_{INV}$ of the control signal S.

The operation of the source driver shown in FIG. 1 will described with reference to the timing chart of FIG. 2. The 2-bit digital video signal data ($D_0$, $D_1$) is fed in synchronization with the falling edge of a clock pulse CK. The sampling memory $M_{SMP}$ of the DA circuit latches digital video signal data $Data_1$, $Data_2$, $Data_3$, . . . corresponding to the respective pixels at the rising of the clock pulse CK, and outputs them to the decoder DEC as data DAM. The decoder DEC which receives the data $Data_i$ makes one of the outputs of the output terminals $Y_0$–$Y_3$ effective, and the corresponding one of the analog switches $ASW_0$–$ASW_3$ is conductive. For example, if the contents of the $Data_1$ is ($D_0$, $D_1$)=(1, 1), the switch $ASW_3$ is conductive, and the external voltage $V_3$ is selected to be output as the output $DA_{out}$ of the DA circuit.

The outputs $DA_{out}$ of the DA circuit are supplied to the two signal lines of all the signal voltage hold circuits $MO_i$. However, the voltage is not applied to the capacitor $C_{M1}$ or $C_{M2}$ and not taken into each signal voltage hold circuit $MO_i$ until the input analog switch $ASWM_1$ or $ASWM_2$ of the signal voltage hold circuit $MO_i$ is conductive.

Figure 2:
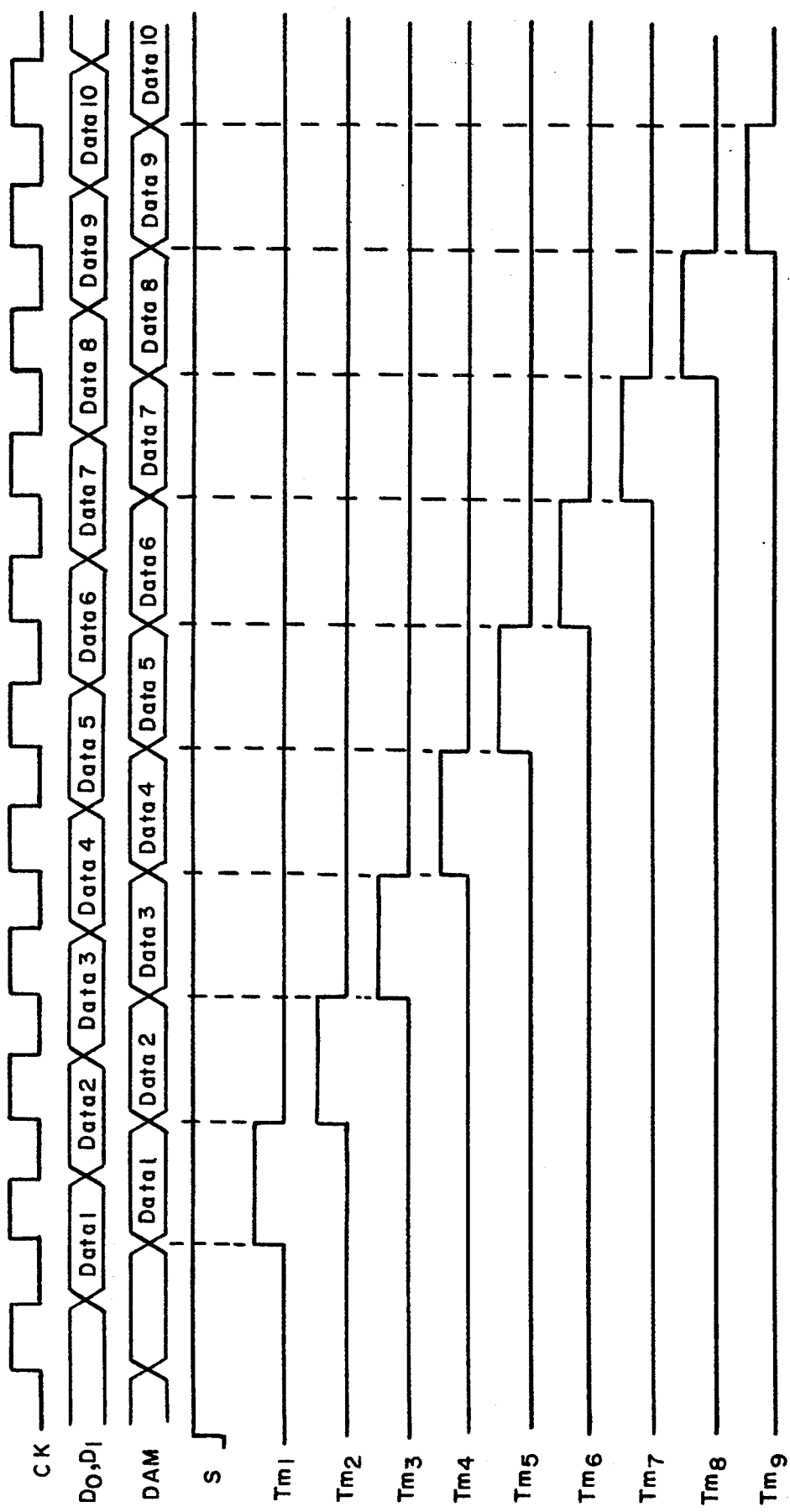
FIG. 2 is a timing chart illustrating the operation of the source driver of the embodiment.

In this embodiment, the control signal S is at a high level (H) as shown in FIG. 2. The inverted signal $S_{INV}$ of the control signal S is at a low level (L), so that the output $CNT_2$ of the second AND circuit $AND_2$ into one input of which the inverted signal $S_{INV}$ is input is always L. Therefore, during the H period of the control signal S (which corresponds to an on-state of the control signal S) (in the timing chart of FIG. 2, the control signal S is kept H), the input analog switch $ASWM_2$ of the second signal line of each signal voltage hold circuit $MO_i$ is always inconductive, and the output $DA_{out}$ of the DA circuit is not applied to the capacitor $C_{M2}$. On the other hand, the output of the first AND circuit $AND_1$ to which the control signal S is supplied at one input varies depending on the level of the selection pulse $Tm_i$. In the circuit of this embodiment, as shown in FIG. 2, the selection pulses $Tm_1$, $Tm_2$, $Tm_3$, ... sequentially become H (corresponding to an on-state of the respective selection pulses) in synchronization with the rising of the clock pulse CK. The H duration of each of the selection pulses $Tm_1$, $Tm_2$, $Tm_3$, ... is equal to one period of the clock pulse CK. When the selection pulse $Tm_1$ corresponding to the first signal voltage hold circuit $MO_1$ becomes H, the output $CNT_1$ of the AND circuit $AND_1$ also becomes H, and the input analog switch $ASWM_1$ of the first signal line is conductive. Thus, the output $DA_{out}$ of the DA circuit is applied to the capacitor $C_{M1}$ to charge it. The charging time for the capacitor $C_{M1}$ is the H duration of the selection pulse $Tm_1$, that is, one period of the clock pulse CK.

As soon as the selection pulse $Tm_1$ corresponding to the first signal voltage hold circuit $MO_1$ drops to L, (corresponding to an off-state of the selection pulse) the selection pulse $Tm_2$ corresponding to the next signal voltage hold circuit $MO_2$ becomes H. Thus, the capacitor $C_{M1}$ of the first signal line of the second signal voltage hold circuit $MO_2$ is charged by the external voltage corresponding to the data $Data_2$. In this way, the capacitors $C_{M1}$ of the first signal line of respective signal voltage hold circuits $MO_i$ are sequentially charged by the voltages which correspond to the data $Data_i$ sampled.

Since the inverted signal $S_{INV}$ (in this case, always L) of the control signal S is applied to the control terminal of the output analog switch $ASWO_1$ of the first signal line, during this period (i.e., period for which the capacitors $C_{M1}$ of the first signal line are sequentially charged by the applied signal voltages), the output analog switches $ASWO_1$ of all the signal voltage hold circuits $MO_i$ are inconductive. Therefore, the voltages of the capacitors $C_{M1}$ are held as they are.

When the control signal S drops to L (corresponding to an off-state of the control signal S) after the capacitors $C_{M1}$ of the first signal line of the signal voltage hold circuits $MO_i$ corresponding to all the pixels on one scanning line are charged, the output analog switches $ASWO_1$ of all the signal voltage hold circuits $MO_i$ become conductive. Thus, the signal voltages held in the respective capacitors $C_{M1}$ are output to the source lines $O_i$ through the buffer amplifiers A, at the same time.

During the L period of the control signal S, the operation is performed in an inverse manner with respect to the operation performed during the H period of the control signal S as described above. Namely, the input analog switches $ASWM_1$ in all of the signal voltage hold circuits $MO_i$ are always inconductive, and the signal voltages held in the capacitors $C_{M1}$ are output to the source lines $O_i$ as described above. The input analog switches $ASWM_2$ of the second signal line are sequentially conductive as the selection pulses $Tm_i$ become H. Thus, external voltages corresponding to the sampled video signal data $Data_1$, $Data_2$, $Data_3$, ... are held into the capacitors $C_{M2}$ in the signal voltage hold circuits $MO_i$, respectively. When the control signal S changes to H again after the signal voltages are held in the capacitors $C_{M2}$ in all of the signal voltage hold circuits $MO_i$, the output analog switches $ASWO_2$ of the second signal line become conductive at the same time. Accordingly, the signal voltages held in the capacitors $C_{M2}$ are output to the respective source lines $O_i$, so as to charge the respective pixels in the LCD apparatus by the corresponding signal voltages.

Figure 13A:
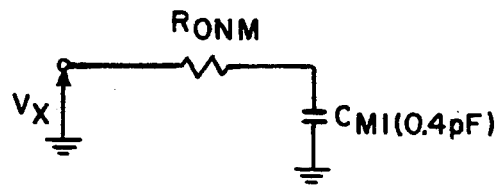
FIGS. 13A–C show equivalent circuits of the source drivers in the first and second embodiments and the prior art source driver in which a signal voltage is supplied to a source line.
Figure 13B:
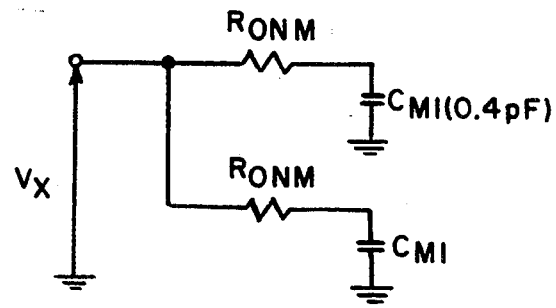
Figure 13C:
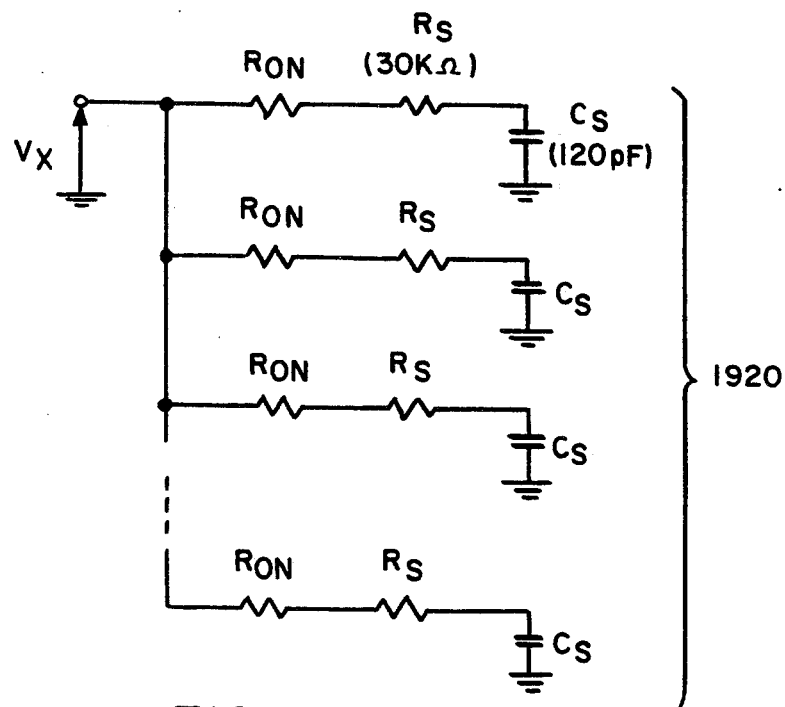
Figure 19:
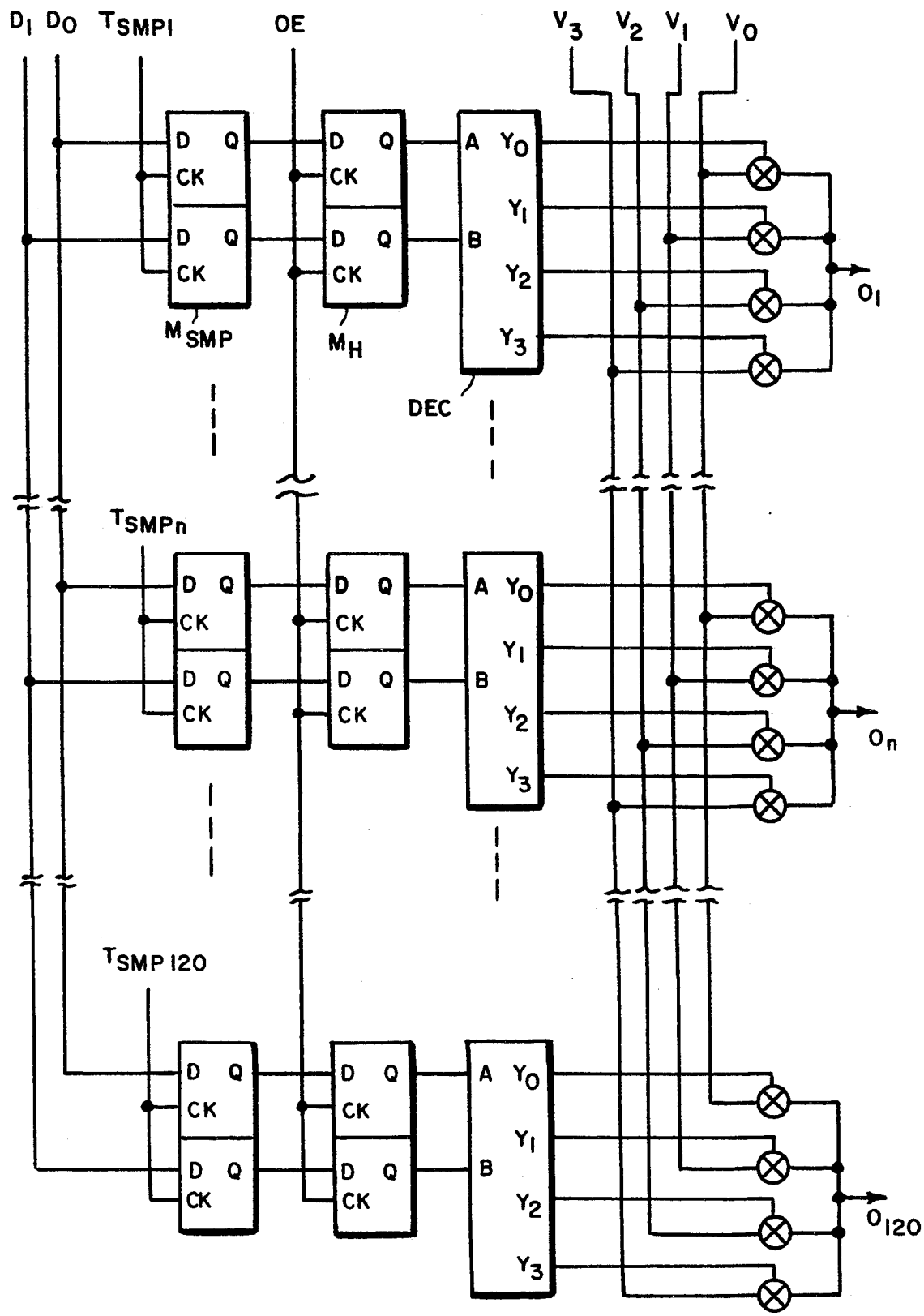
FIG. 19 is a circuit diagram showing a drive circuit in which a digital sampling circuit is provided for each source line.

As described above, in the source driver of the embodiment shown in FIG. 1, the external voltage source $V_x$ is connected only to one of the two capacitors $C_{M1}$ and $C_{M2}$ of one signal voltage hold circuit $MO_i$ selected by a selection pulse $Tm_i$. The equivalent circuit in this case is shown in (a) of FIG. 13. The load of the external voltage $V_x$ consists of only the on-resistance $R_{ON}$ of the selected one input analog switch $ASWM_1$ (or $ASWM_2$) and the capacitance of the capacitor $C_{M1}$ (or $C_{M2}$). Since the on-resistance of the analog switch $ASWM_1$ (or $ASWM_2$) is very small and the capacitance of the capacitor $C_{M1}$ (or $C_{M2}$) can be made as small as 0.4 pF, the load of the external voltage source is small. By contrast, for example, in the drive circuit shown in FIG. 19, the external voltage $V_x$ directly drives the pixels. Therefore, as shown in (c) of FIG. 13, the resistance $R_s$ and the electric capacitance $C_s$ of the source line also are connected to the on-resistance $R_{ON}$ of the analog switch ASWM. Specifically, the values of the resistance $R_s$ and the capacitance $C_s$ have a large value such as approximately 30 k$\Omega$ and 120 pF respectively. Moreover in the circuit of FIG. 19, the selected external voltage source $V_x$ is connected to a large number of pixels on one scanning line (for example, in a color display apparatus with 640 dots for one horizontal line, the maximum number of pixels is 640×3 (RGB)=1920). In the drive circuit of FIG. 19, since the loads of the external voltage sources $V_0$–$V_3$ are very large, it is necessary to prepare voltage sources having a large capacity. By contrast, in the embodiment of FIG. 1, since the external voltage sources $V_0$–$V_3$ are respectively used only for applying a voltage to one capacitor $C_{M1}$ (or $C_{M2}$), the power source device is a very simple one, irrespective of the number of pixels. Furthermore, when the number of external voltage sources is drastically increased with the power of 2 by the increase of the bit number of the digital video signal data (which will be described below), the light load of the power source device will be very advantageous as a drive circuit.

Figure 14A:
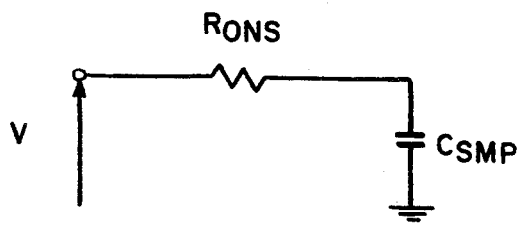
FIGS. 14A and 14B show equivalent circuits of signal input portions in the source drivers of the prior art and the invention.
Figure 14B:
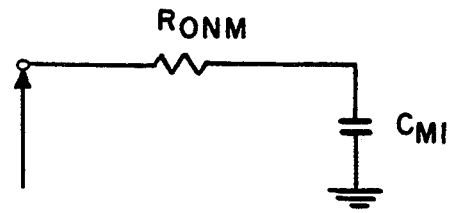
Figure 17:
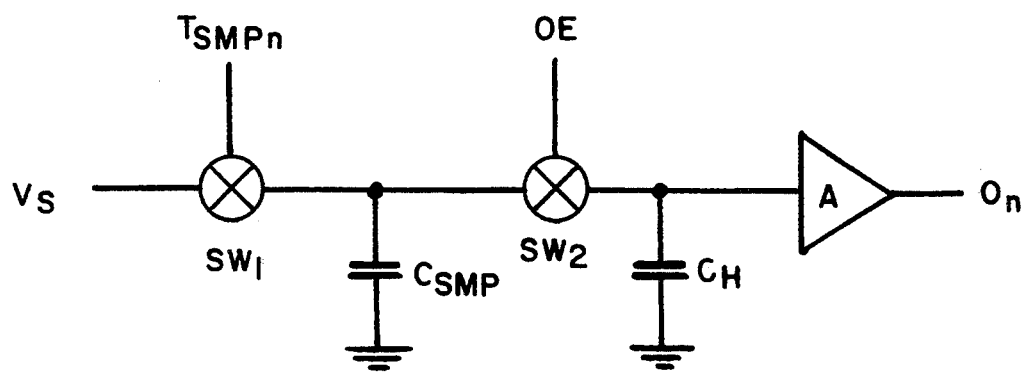
FIG. 17 is a circuit diagram showing a portion of one source line in the circuit of FIG. 16.
Figure 18:
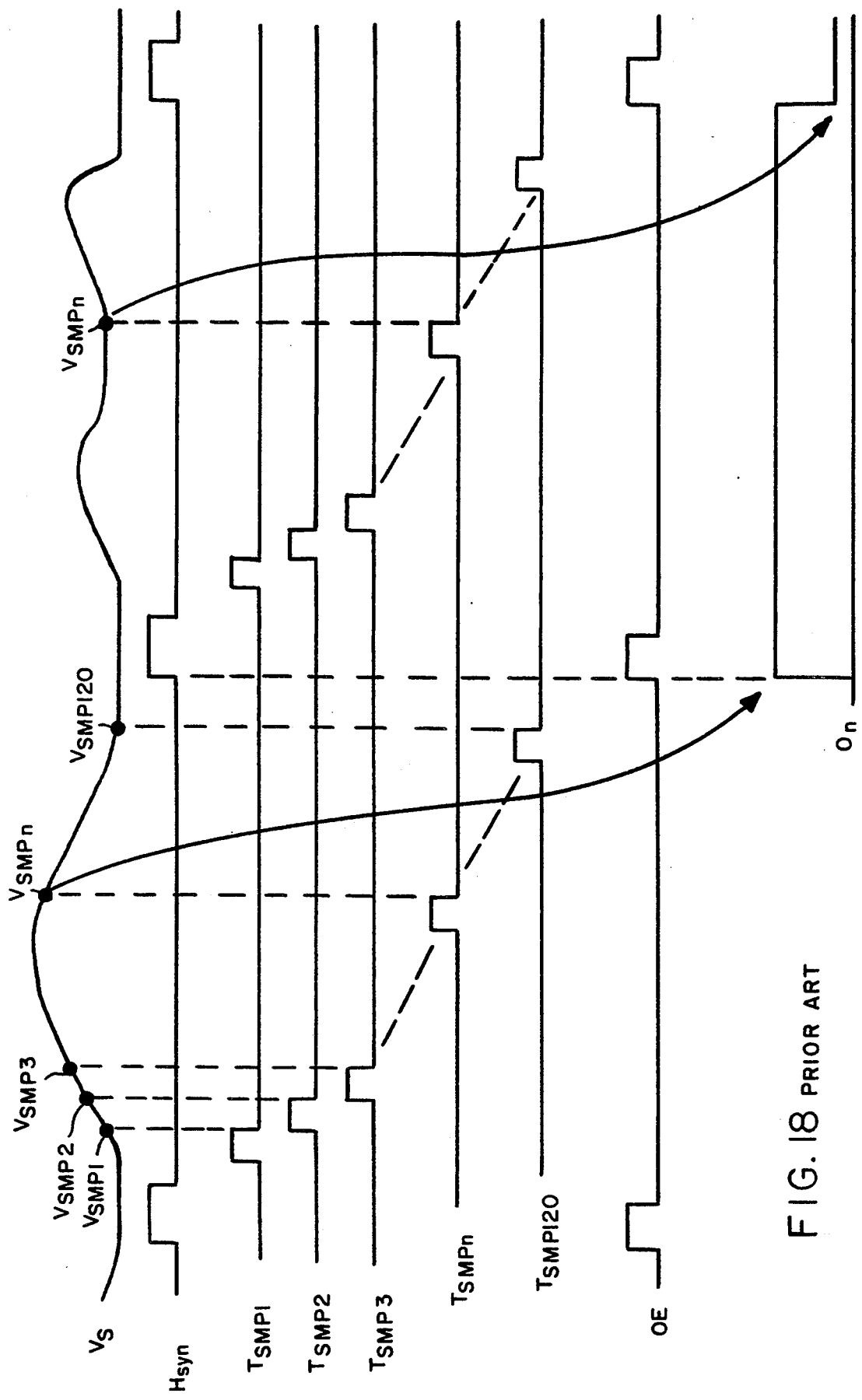
FIG. 18 is a timing chart illustrating the operation of the drive circuit.

Moreover, in the embodiment of FIG. 1, the voltage charged in the capacitor $C_{M1}$ (or $C_{M2}$) of the signal voltage hold circuit $MO_i$ as it is becomes the voltage output to the source line $O_i$ via the buffer amplifier A. In the prior art circuit shown in FIG. 17, since the voltage of the sampling capacitor $C_{SMP}$ is transferred to the holding capacitor $C_H$, the voltage is decreased as indicated by expression (1). In the circuit of the invention, since only one capacitor is used, the signal voltage can be prevented from decreasing. Accordingly, the values of the capacitors $C_{M1}$ and $C_{M2}$ in the circuit of the invention are not restricted unlike those in the circuit of FIG. 17, and these values can be made small as long as the charge can be held for a required time period. This will be described in more detail with reference to FIG. 14. The equivalent circuit for a case where the prior art capacitor $C_{SMP}$ is charged is shown in (a) of FIG. 14, and that for another case where the capacitor $C_{M1}$ in the circuit of the invention is charged is shown in (b) of FIG. 14. The time periods $\tau_{SMP}$ and $\tau_{M1}$ necessary to charge the capacitors $C_{SMP}$ and $C_{M1}$ are represented as follows:

$$\tau_{SMP} = k \cdot R_{ONS} \times C_{SMP}$$

$$\tau_{M1} = k \cdot R_{ONM} \times C_{M1}$$

where $R_{ONS}$ is the on-resistance of the analog switch $SW_1$ shown in FIG. 17, and $R_{ONM}$ is the on-resistance of the input analog switch $ASWM_1$ shown in FIG. 1. As described above, since the capacitance of the capacitor $C_{M1}$ can be made sufficiently smaller than that of the capacitor $C_{SMP}$ in the prior art ($C_{M1} << C_{SMP}$), if the charge time periods are equal ($\tau_{SMP} = \tau_{M1}$), the on-resistance $R_{ONM}$ of the analog switch $ASWM_1$ can be sufficiently larger than the on-resistance $R_{ONS}$ of the analog switch $SW_1$ of the prior art circuit (FIG. 17) ($R_{ONM} >> R_{ONS}$). For example, if the capacitance of the capacitor $C_{M1}$ is one tenth as compared with the prior art ($C_{M1} = C_{SMP}/10$), the on-resistance $R_{ONM}$ of the analog switch $ASWM_1$ can be ten times as large as in the prior art ($R_{ONM} = 10 \cdot R_{ONS}$). It means that the analog switches $ASWM_1$ and $ASWM_2$, and the capacitors $C_{M1}$ and $C_{M2}$ can be made much smaller than in the prior art. The amount of charge to be transferred via the output analog switches $ASWO_1$ and $ASWO_2$ is small, so that it is not necessary to make the on-resistances of the output analog switches $ASWO_1$ and $ASWO_2$ small. Moreover, since such elements can be made smaller in each of the signal voltage hold circuits $MO_i$ the number of which is equal to that of the source lines $O_i$ (in FIG. 1, the number is 120), the reduction in element size as a whole greatly contribute to the reduction of the area, and the drive circuit LSI can be highly integrated. The size-reduced elements also contribute to the reduction of the production cost. The characteristics of capacitors $C_{M1}$ (or $C_{M2}$) may be different among the signal voltage hold circuits $MO_i$ so long as the capacitor $C_{M1}$ (or $C_{M2}$) can sufficiently hold the signal voltage, whereby the chip can be produced readily and at a low cost.

Figure 3:
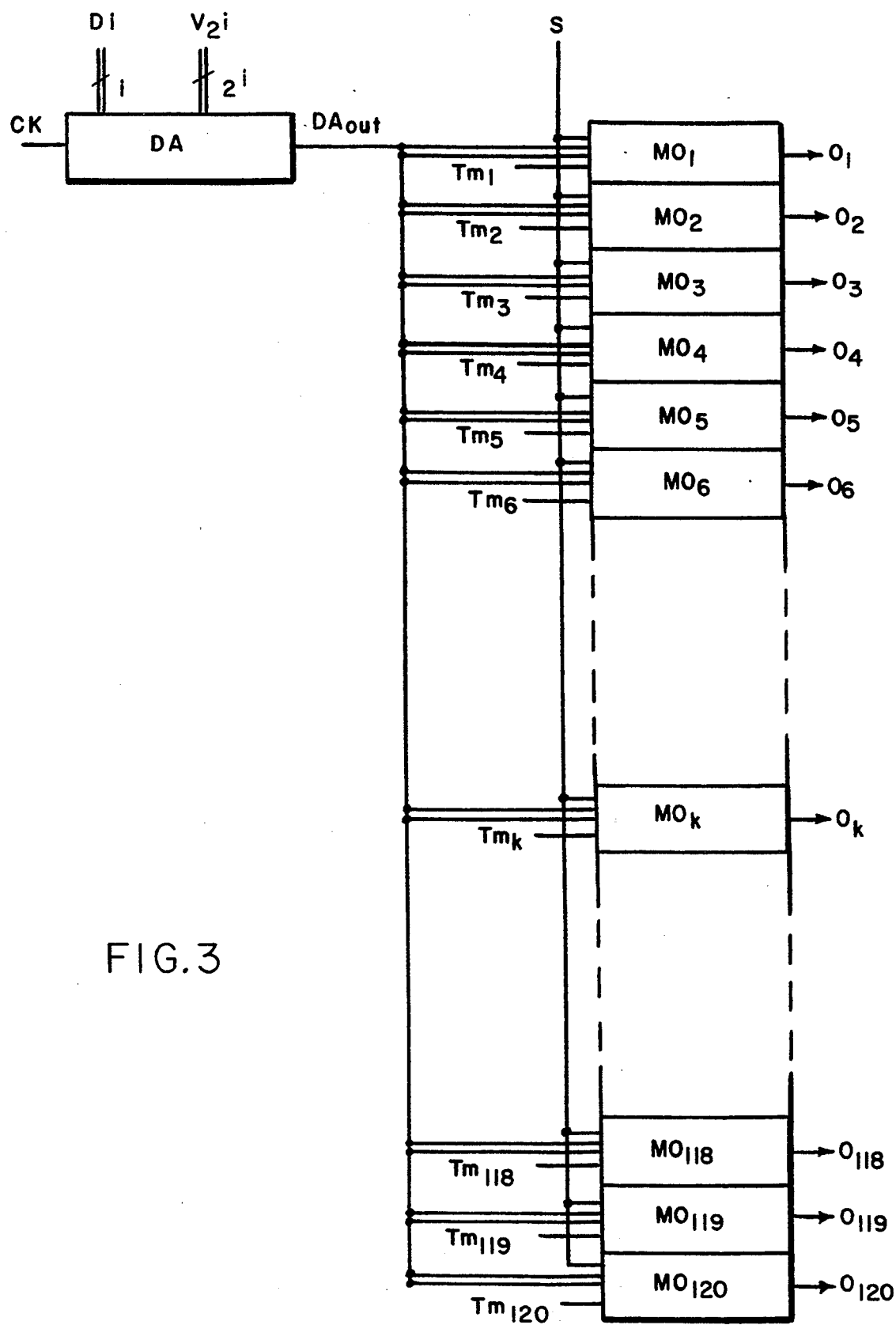
FIG. 3 is a block diagram showing the circuit of FIG. 1 in a simplified manner.

FIG. 3 is a block diagram showing in a simplified manner of the source driver in the embodiment of FIG. 1. The source driver in this embodiment is provided with one DA circuit. The output $DA_{out}$ is connected to two signal lines of each of 120 signal voltage hold circuits $MO_1$–$MO_{120}$. Actually, the signal voltage is sent out only to one signal voltage hold circuit $MO_i$ (in more detail, to one of the two signal lines) selected by a selection pulse $Tm_i$. In FIG. 3, digital video signal data is i-bits, and represented by a vector $D_i$. Accordingly, the number of external voltage levels should be $2^i$, and the external voltage is represented by a vector $V_i$.

Figure 4:
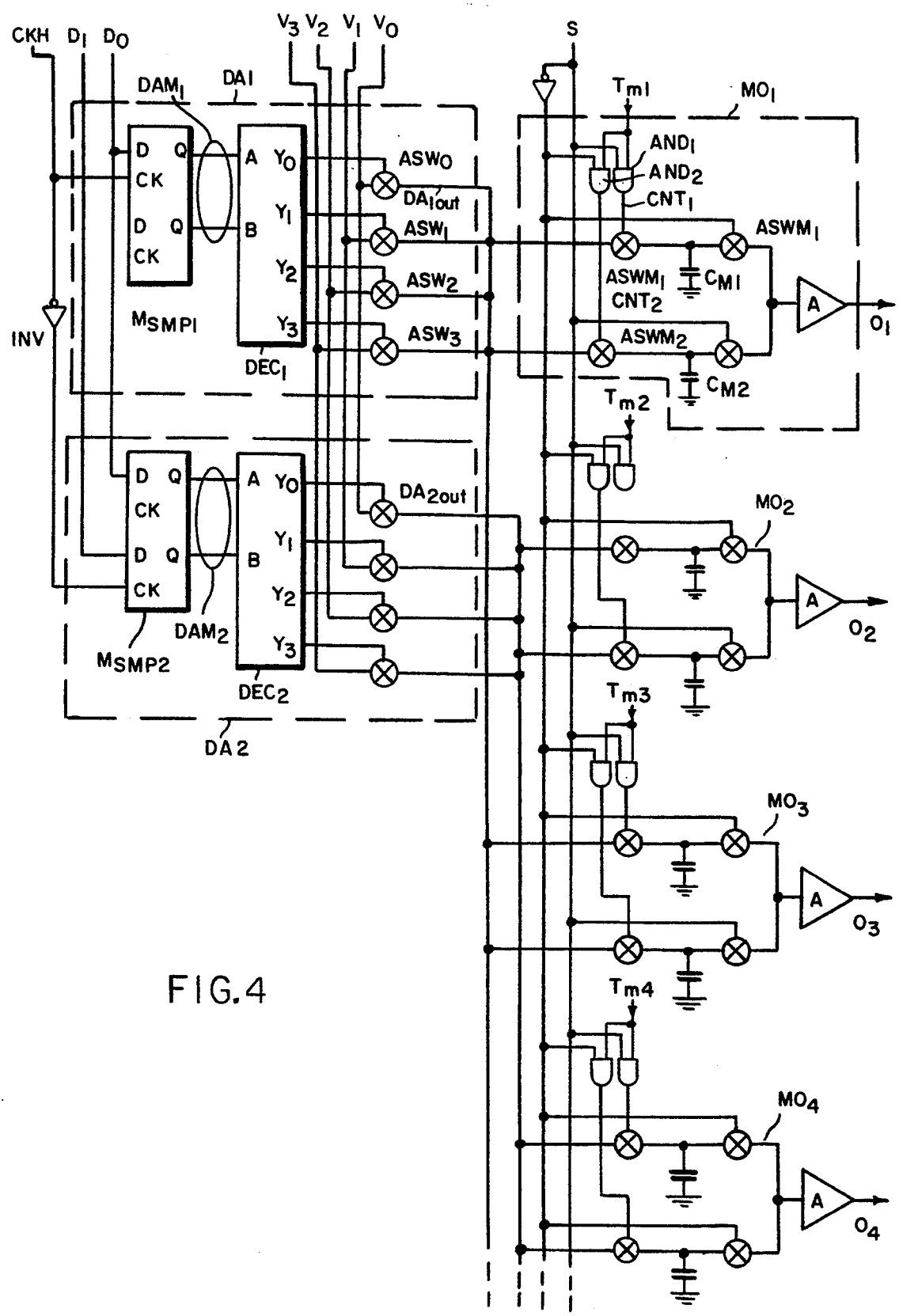
FIG. 4 is a circuit diagram showing a source driver provided with two DA circuits in a second embodiment of the invention.

A second embodiment of the invention is shown in FIG. 4. The second embodiment comprises a source driver which is provided with two DA circuits DA1 and DA2. In the embodiment, half of the 120 source lines $O_1$–$O_{120}$ ((120/2)=60) is assigned to each of the DA circuits. The two DA circuits receive digital video signal data, and output one of external voltages $V_0$–$V_3$ as outputs $DA_{1out}$ and $DA_{2out}$ in accordance with the values of the received data, respectively. The first DA circuit DA1 is connected to the signal voltage hold circuits $MO_{2k-1}$ for odd source lines $O_{2k-1}$ such as the 1st and 3rd source lines. The second DA circuit DA2 is connected to the signal voltage hold circuits $MO_{2k}$ for even source lines $O_{2k}$ such as the 2nd and 4th source lines. In this embodiment, the clock pulse CK is not used as it is, but a pulse CKH the frequency of which is divided in half as compared with the clock pulse CK is used as a sampling pulse in a sampling memory $M_{SMP}$ in the first DA circuit DA1. In a sampling memory $M_{SMP}$ in the second DA circuit DA2, the inverted pulse of the pulse CKH through an inverter INV is used as a sampling pulse.

Figure 5:
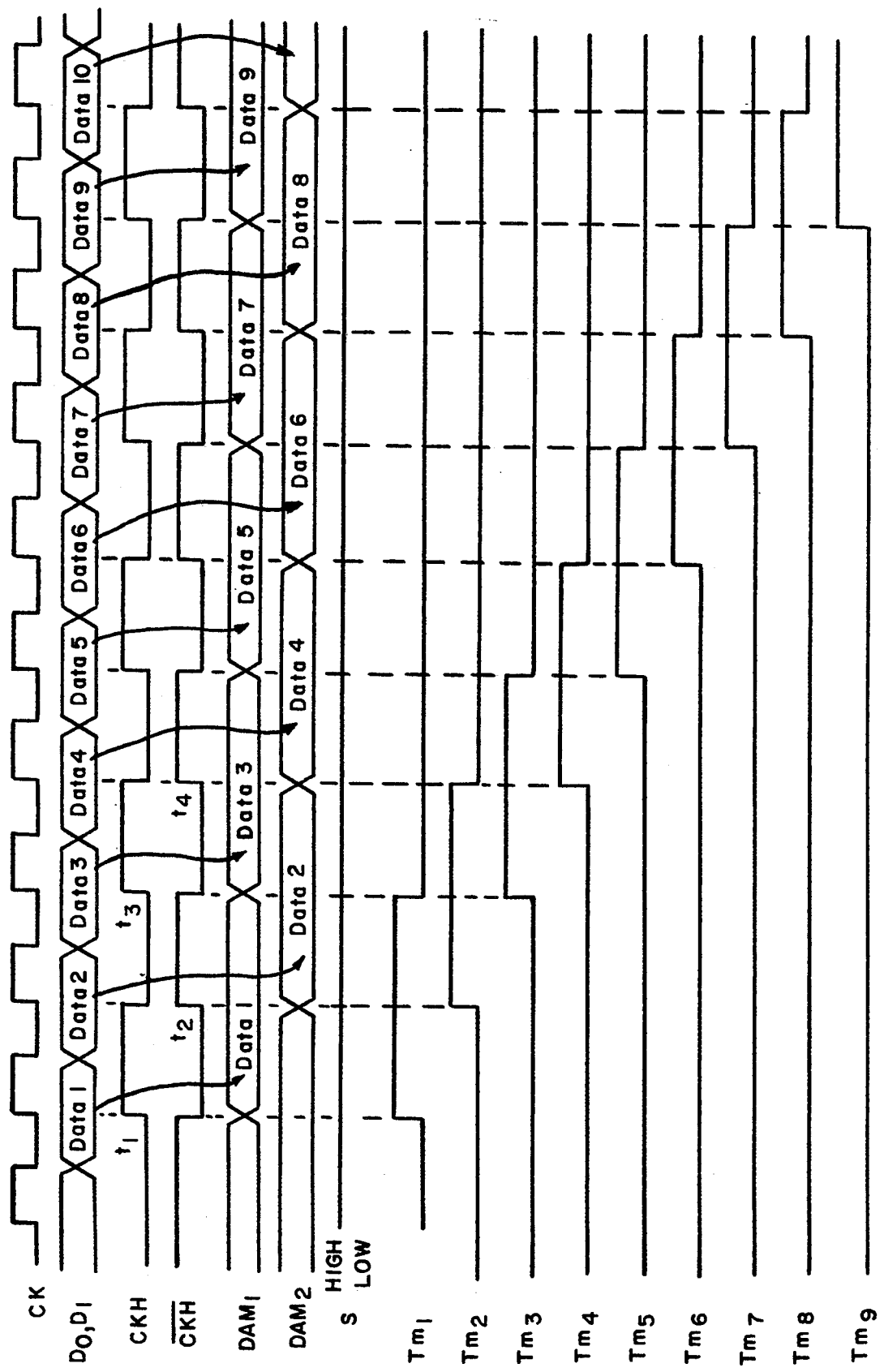
FIG. 5 is a timing chart illustrating the operation of the source driver of the second embodiment.

The operation of the circuit is described with reference to the signal timing chart of FIG. 5. The digital video signal data ($D_0$, $D_1$) ks sampled by the sampling memory $M_{SMP}$ of the first DA circuit DA1 at every rising of the clock pulse CKH having half-divided frequency (times $t_1$, $t_3$, ... ), and sampled by the sampling memory $M_{SMP}$ of the second DA circuit DA2 at every rising of the inverted signal $CKH_{INV}$ of the pulse CKH (i.e., the falling of the pulse CKH) (times $t_2$, $t_4$, ... ). Thus, the first sampling memory $M_{SMP1}$ samples data of odd numbers such as the first data $Data_1$ and the third data $Data_3$. The second sampling memory $M_{SMP2}$ samples data of even numbers such as the second data $Data_2$ and the fourth data $Data_4$. The sampling memories sample at every period of the clock pulse CKH having a half-divided frequency, so that the data are held in the sampling memories $M_{SMP1}$ and $M_{SMP2}$ for two periods of the clock pulse CK. The outputs $DAM_1$ and $DAM_2$ of the sampling memories $M_{SMP1}$ and $M_{SMP2}$ are supplied to the decoders $DEC_1$ and $DEC_2$, respectively. Each of the decoders $DEC_1$ and $DEC_2$ selects one of the external voltages $V_0$–$V_3$ in accordance with the same logic as in the decoder DEC shown in FIG. 1. The external voltages selected by the decoders $DEC_1$ and $DEC_2$ are output to the odd and even signal voltage hold circuits $MO_i$ as outputs $DA_{1out}$ and $DA_{2out}$, respectively.

Figures 1, 6:
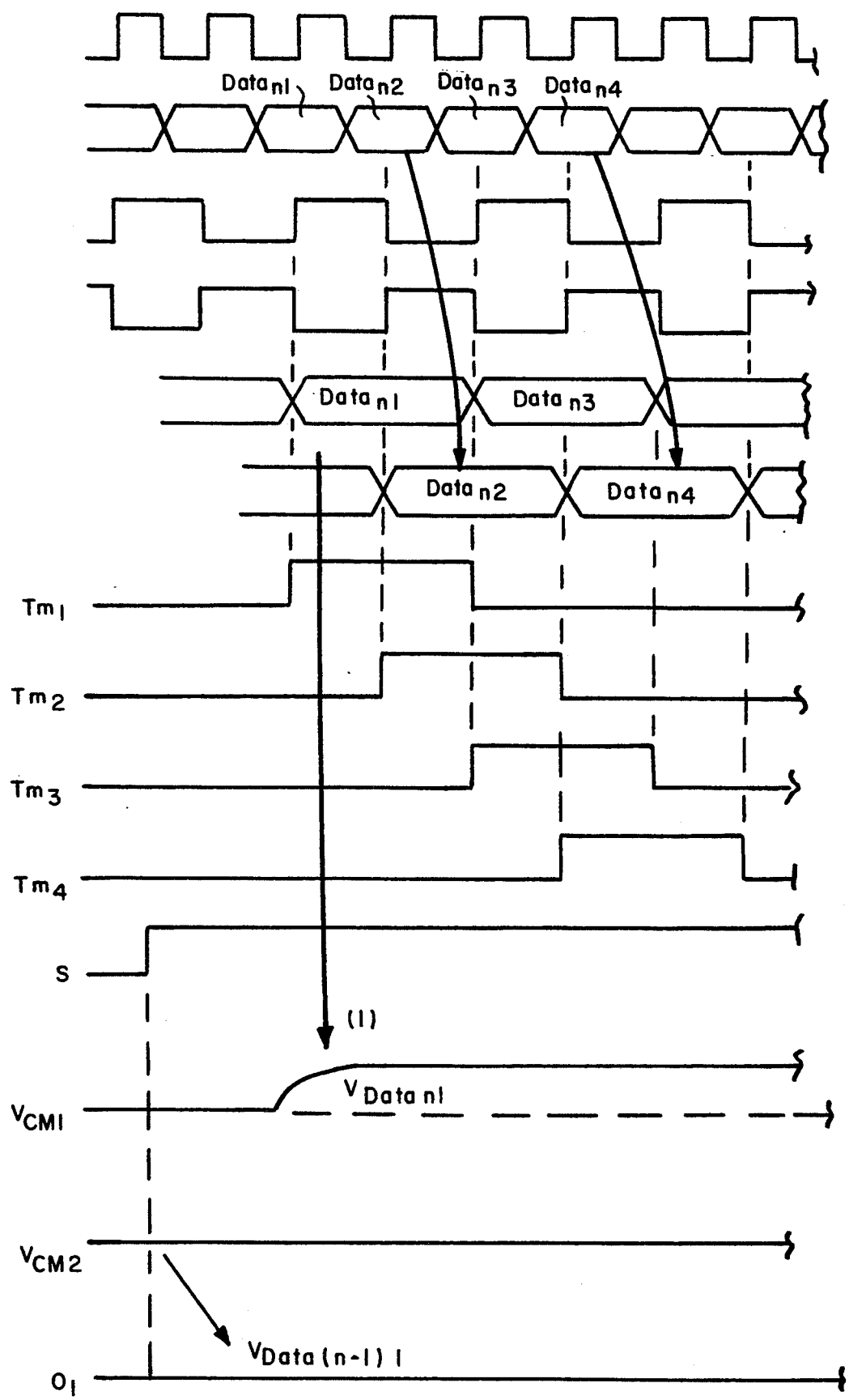
Figures 2, 6:
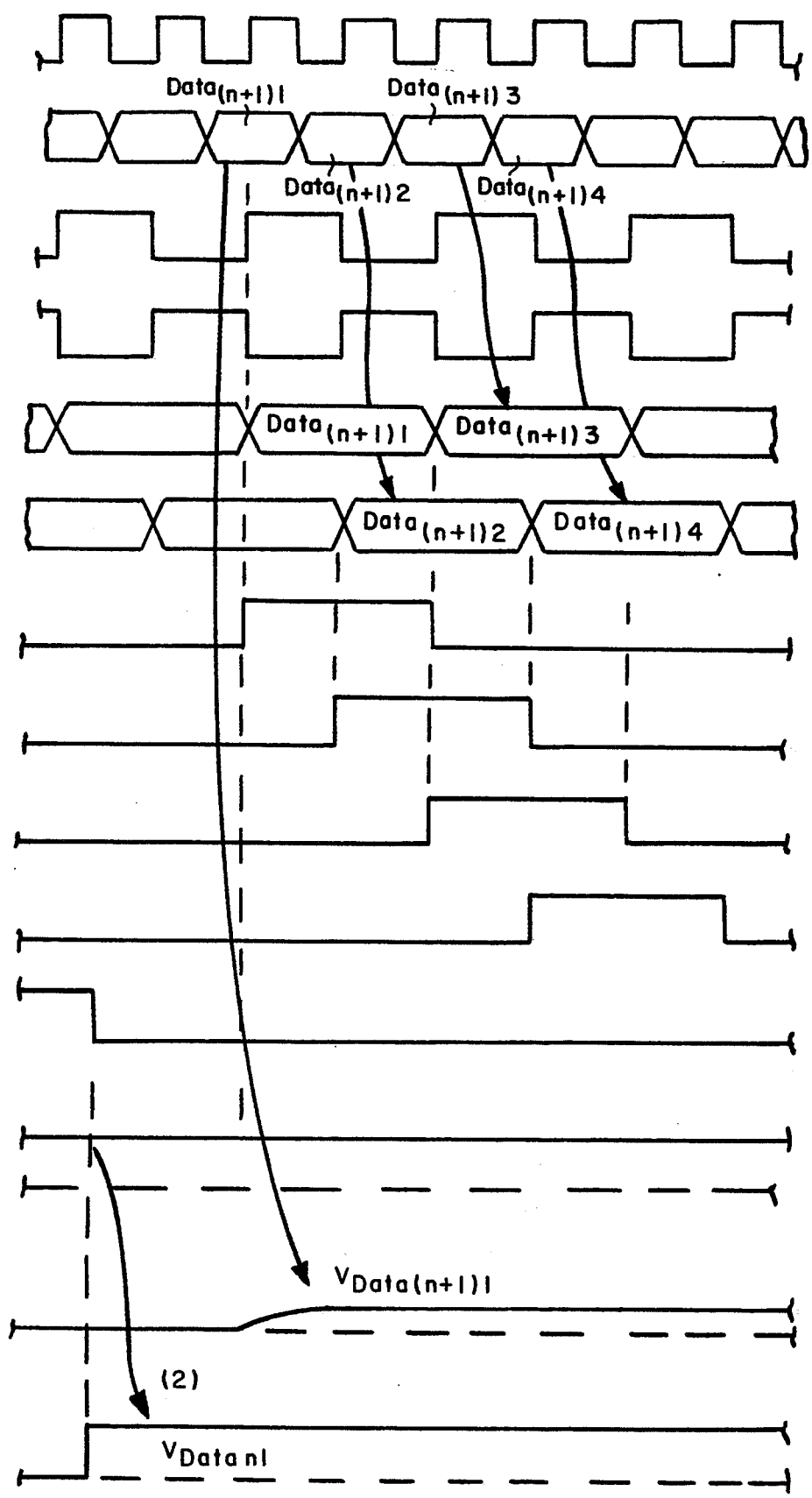
Figures 3, 6:
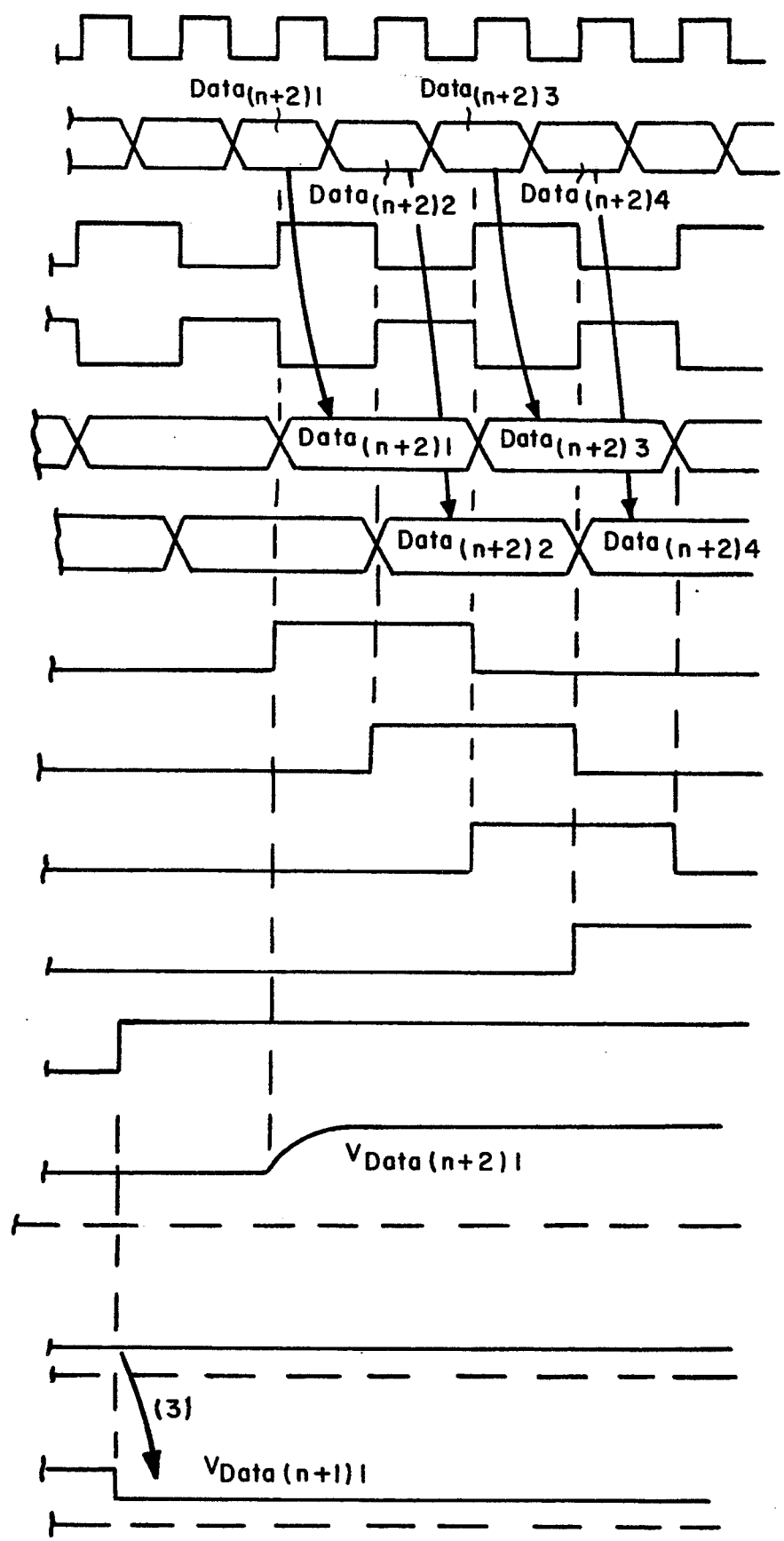

Two signal lines of each of the signal voltage hold circuits $M)_1$–$MO_{120}$ receive one of the outputs $DA_{1out}$ and $DA_{2out}$ of the two DA circuits. In the same way as in the first embodiment (FIG. 1), only in one of the signal voltage hold circuits $MO_i$ sequentially selected by the selection pulse $Tm_i$, the signal voltage $DA_{1out}$ or $DA_{2out}$ is applied to the capacitor $C_{M1}$ or $C_{M2}$ of the corresponding one of the signal lines. Unlike the embodiment of FIG. 1, this embodiment is provided with the two DA circuits for sampling the data, so that the duration of the selection pulse $Tm_i$ is equal to the two periods of the clock pulse. Therefore, the signal voltage $DA_{1out}$ or $DA_{2out}$ is applied to the capacitor $C_{M1}$ (or $C_{M2}$) for a time period twice as long as that in the embodiment of FIG. 1. Thus, when all of the capacitors $C_{M1}$ (or $C_{M2}$) of the 120 signal voltage hold circuits $MO_1$–$MO_{120}$ hold the signal voltages, the control signal S is inverted. Then, the output analog switches $ASWO_1$ (or $ASWO_2$) of the signal voltage hold circuits $MO_1$–$MO_{120}$ become conductive at the same time, so that the signal voltages held in the respective capacitors $C_{M1}$ (or $C_{M2}$) are output to the source lines $O_1$–$O_{120}$ so as to be applied to the pixels. The timing chart of FIG. 5 shows the case where the control signal S is H as in FIG. 2. The timing chart of FIG. 6 shows the case where the control signal S is sequentially inverted.

In the case of FIGS. 6-1, 6-2, and 6-3, when the control signal S is H for the first time, digital video signal data $Data_{n1}$, $Data_{n3}$, ... on the nth line are sampled by the first DA circuit DA1, and applied to the capacitors $C_{M1}$ of the first signal line in the odd signal voltage hold circuits $MO_1$, $MO_3$, .... For example, the voltage $V_{Datan1}$ corresponding to the data $Data_{n1}$ is applied to and held in the capacitor $C_{M1}$ of the first signal voltage hold circuit $MO_1$ ((1) of FIG. 6). The even digital video signal data $Data_{n2}$, $Data_{n4}$, ... are sampled by the second DA circuit DA2, and applied to the capacitors $C_{M1}$ of the first signal line of the even signal voltage hold circuits $MO_2$, $MO_4$, .... After the capacitors $C_{M1}$ of all the signal voltage hold circuits $MO_i$ hold the signal voltages and when the control signal S changes from H to L, the output analog switches $ASWO_1$ of the first signal line of all the signal voltage hold circuits $MO_i$ become conductive. Accordingly, the signal voltages $V_{Datan1}$, $V_{Datan2}$, ... held in the respective capacitors $C_{M1}$ are output to source lines $O_1$, $O_2$, ... ((2) of FIG. 6). Since the output analog switches $ASWO_1$ are kept conductive during the time when the control signal S is L, the signal voltages of the capacitors $C_{M1}$ continue to be output to the source lines $O_i$. During this time period, the data $Data_{(n+1)1}$, $Data_{(n+1)2}$, ... on the (n+1)th line are sequentially held in the capacitors $C_{M2}$ of the second signal line. Thereafter, when the control signal S changes from L to H, the voltages $V_{Data(n+1)1}$, $V_{Data(n+1)2}$, ... corresponding to the data are output to the source lines $O_1$, $O_2$, ... ((3) of FIG. 6).

In the second embodiment in which two DA circuits are provided, there may occur a case where the selected one of external voltage sources $V_0$–$V_3$ simultaneously supplies voltages to a maximum of two signal voltage hold circuits $MO_i$ through the two DA circuits. The equivalent circuit in this case is shown in (b) of FIG. 13. Though the loads in this case are increased as compared with the first embodiment shown in (a) of FIG. 13, the number of loads is reduced and the loads are much lighter compared with the prior art circuit shown in (c) of FIG. 13 (the loads are 0.4 pF×2 in this embodiment, but 30 kΩ×120 and 120 pF×120 in the prior art circuit).

In the embodiment shown in FIG. 4, the signal voltage $DA_{1out}$ or $DA_{2out}$ generated by the selected external voltage can be applied to the capacitor $C_{M1}$ (or $C_{M2}$) for the period of time twice as long as the duration of the digital video signal data (i.e., the period of the clock pulse). In other words, even if the duration of the digital video signal data is shortened, it is possible to take sufficient time for charging the capacitor $C_{M1}$ (or $C_{M2}$) in the circuit of this embodiment.

Figure 8:
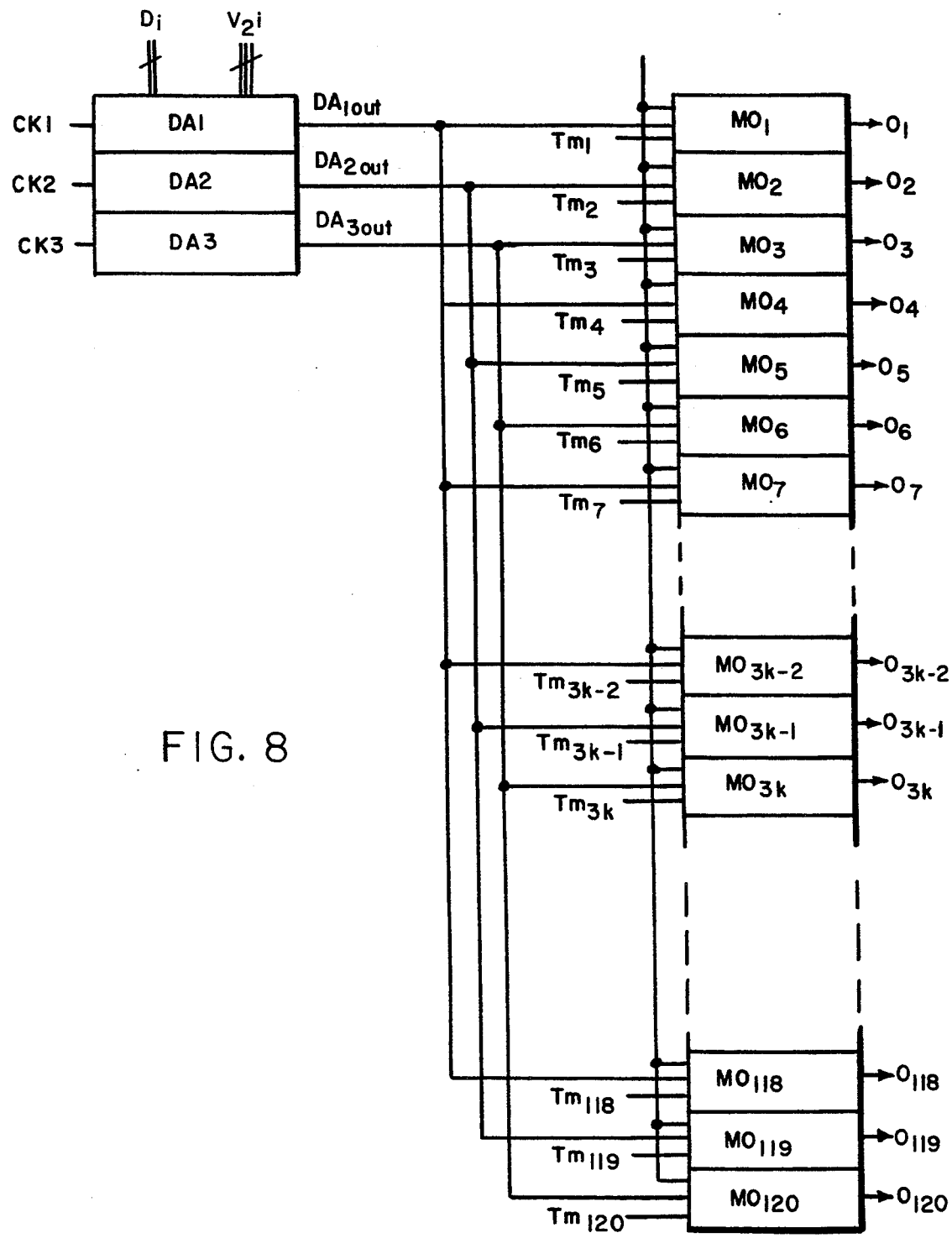
FIG. 8 is a block diagram showing a source driver provided with three DA circuits.
Figure 9:
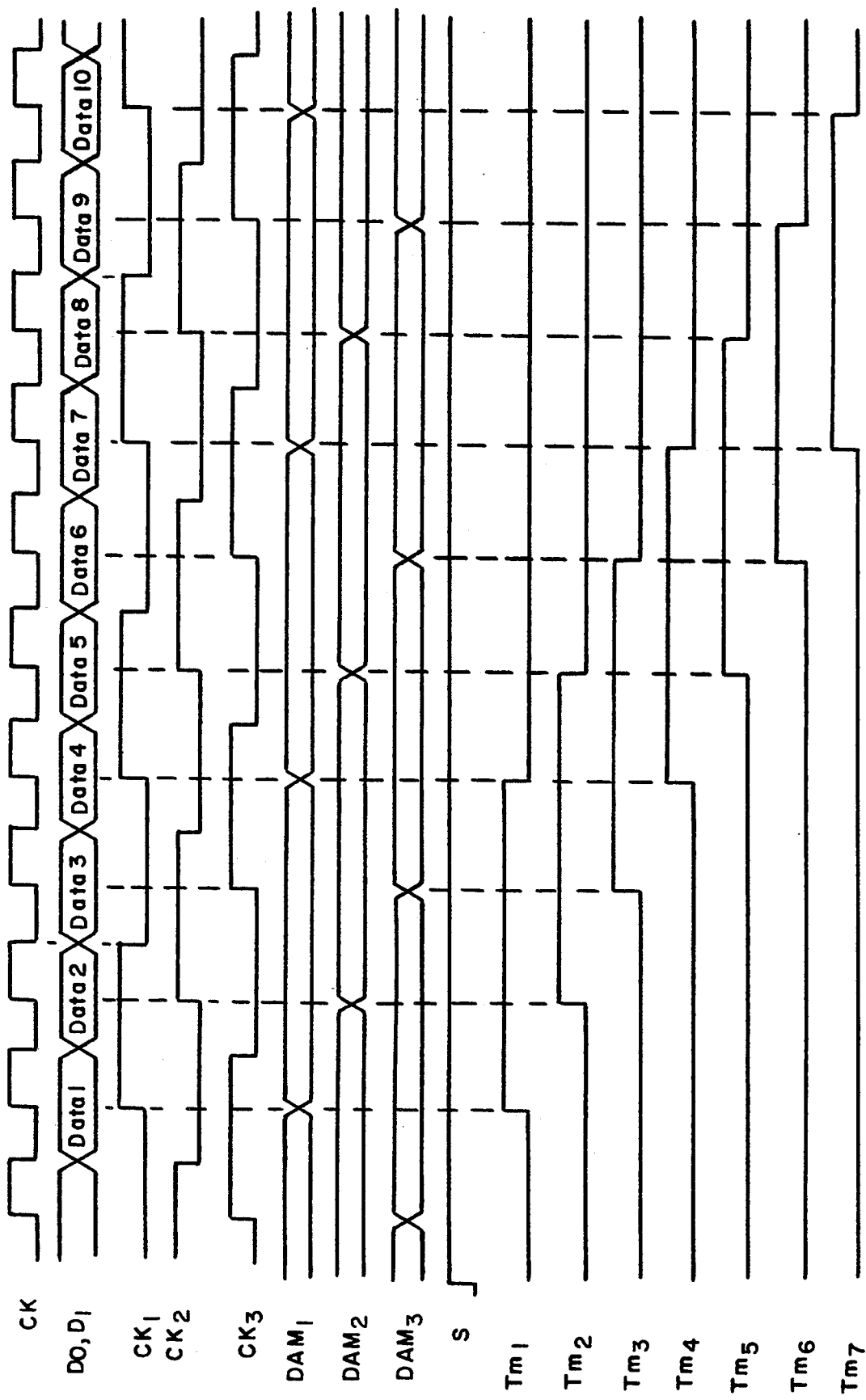
FIG. 9 is a timing chart illustrating the operation of the source driver of FIG. 8.

Another embodiment having a drive circuit which is provided with three DA circuits $DA_1$, $DA_2$ and $DA_3$ is shown in FIG. 8. In this embodiment, the output $DA_{1out}$ of the first DA circuit $DA_1$ is supplied to the (3k-2)th signal voltage hold circuits $MO_{(3k-2)}$ such as the first, fourth and seventh signal voltage hold circuits. The output $DA_{2out}$ of the second DA circuit $DA_2$ is supplied to the (3k-1)th signal voltage hold circuits $MO_{(3k-1)}$ such as the second, fifth and eighth signal voltage hold circuits. The output $DA_{3out}$ of the third DA circuit $DA_3$ is supplied to the 3kth signal voltage hold circuits $MO_{3k}$ such as the third, sixth and ninth signal voltage hold circuits. The signal timing chart in this embodiment is shown in FIG. 9. Each of the DA circuits $DA_1$, $DA_2$ and $DA_3$ samples digital video signal data every three data in accordance with the pulses $CK_1$, $CK_2$ and $CK_3$, and the memory holds the data for the three periods of the clock pulse CK. The frequency of each of the pulses $CK_1$, $CK_2$ and $CK_3$ is divided into three with respect to the clock pulse CK. Accordingly, the duration of the selection pulse $Tm_i$ equals three periods of the clock pulse CK, so that the capacitor $C_{M1}$ (or $C_{M2}$) is charged for a sufficiently long time.

Figure 10:
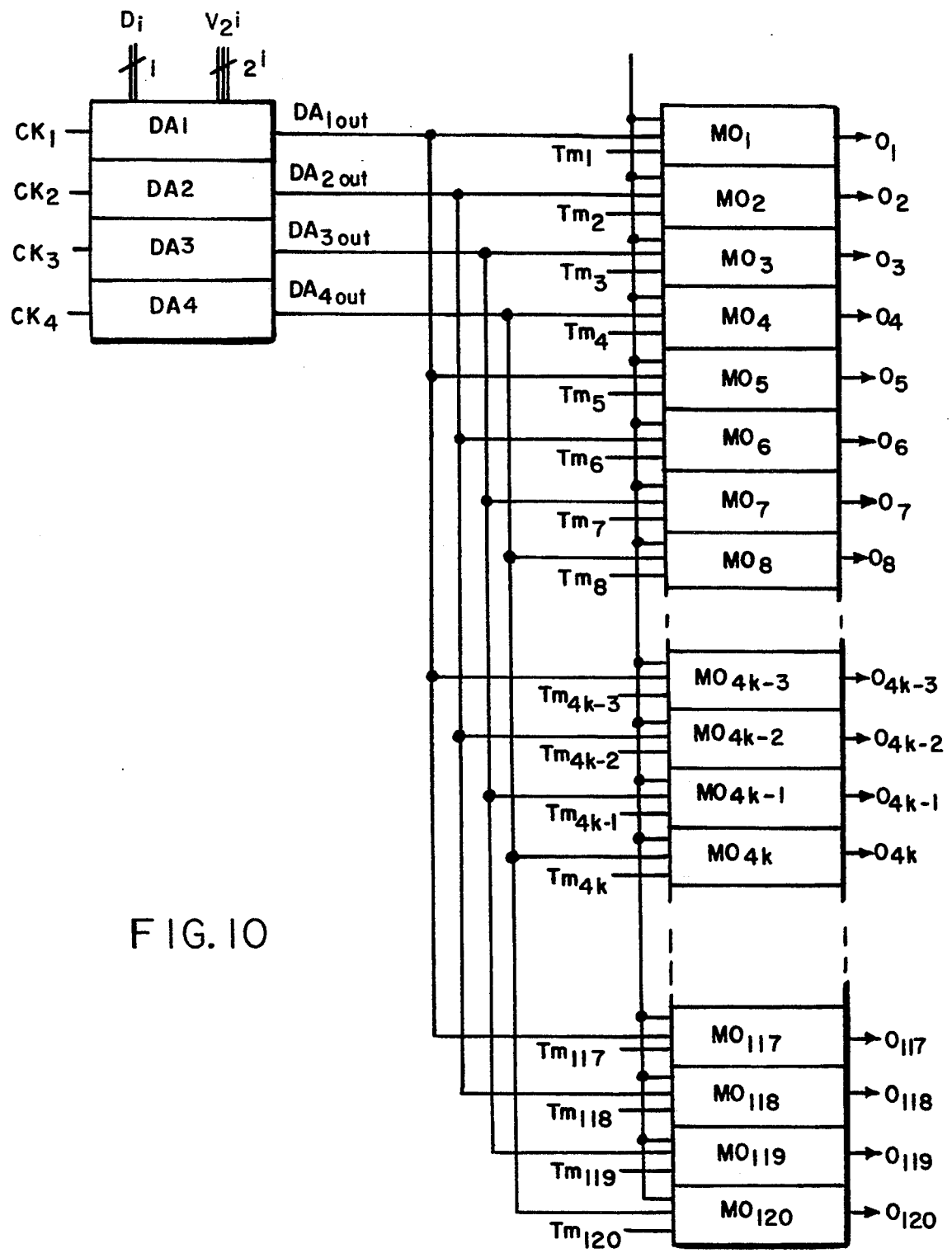
FIG. 10 is block diagram showing a source driver provided with four DA circuits.
Figure 11:
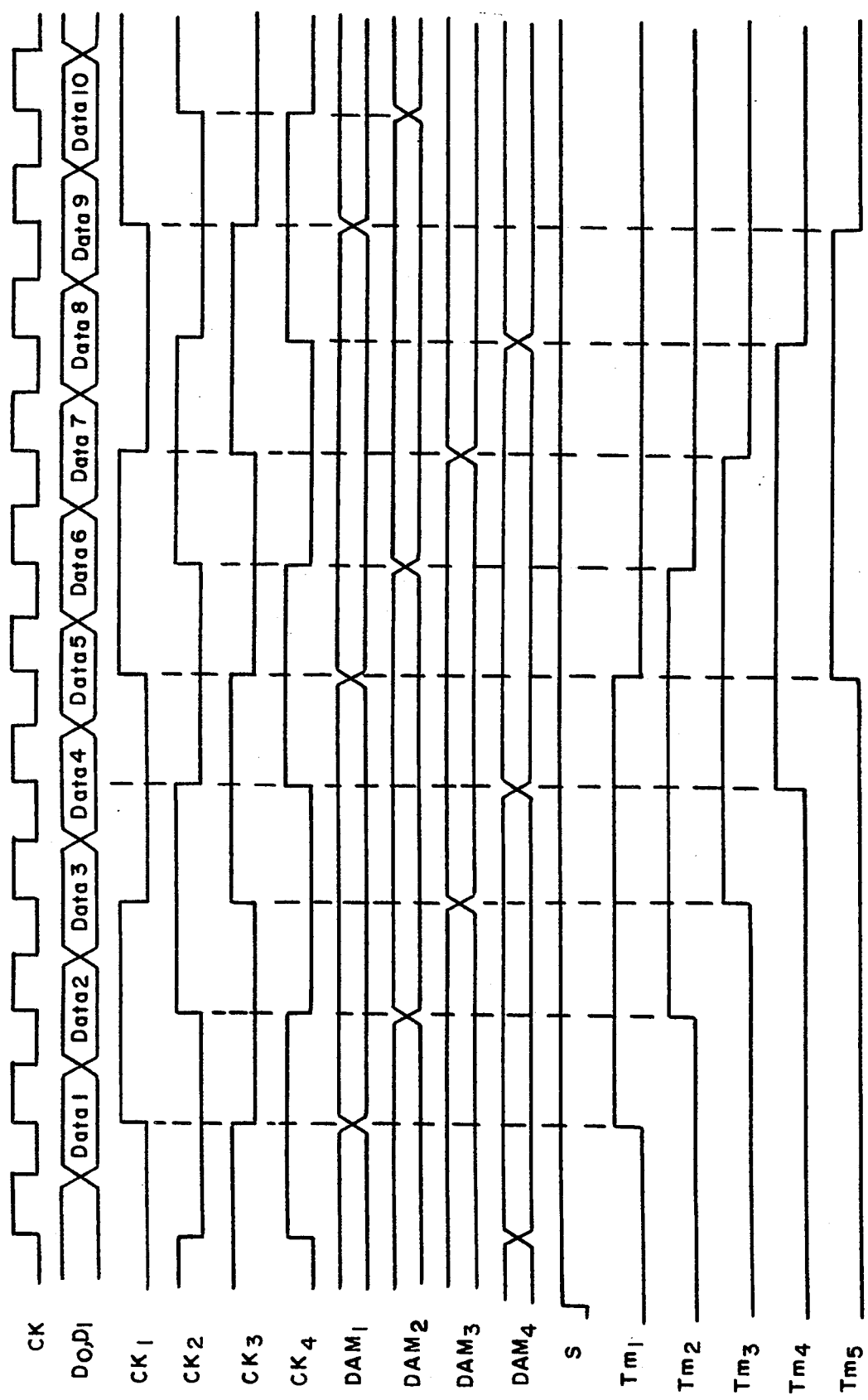
FIG. 11 is a timing chart of the source driver of FIG. 10.

A further embodiment in which four DA circuits are provided is shown in FIG. 10, and the timing chart thereof is shown in FIG. 11. In this embodiment, it is possible to take a long time equal to four periods of clock pulse for charging the capacitor $C_{M1}$ (or $C_{M2}$).

As described above, the provision of plural DA circuits makes At possible to take a longer data holding time, also to take a sufficiently long time for charging the capacitor $C_{M1}$ (or $C_{M2}$). Therefore, the drive circuit is extremely advantageous, when the duration of the input signal is shortened as the number of pixels is increased by increasing the size and improving the resolution of the display apparatus.

Figure 12:
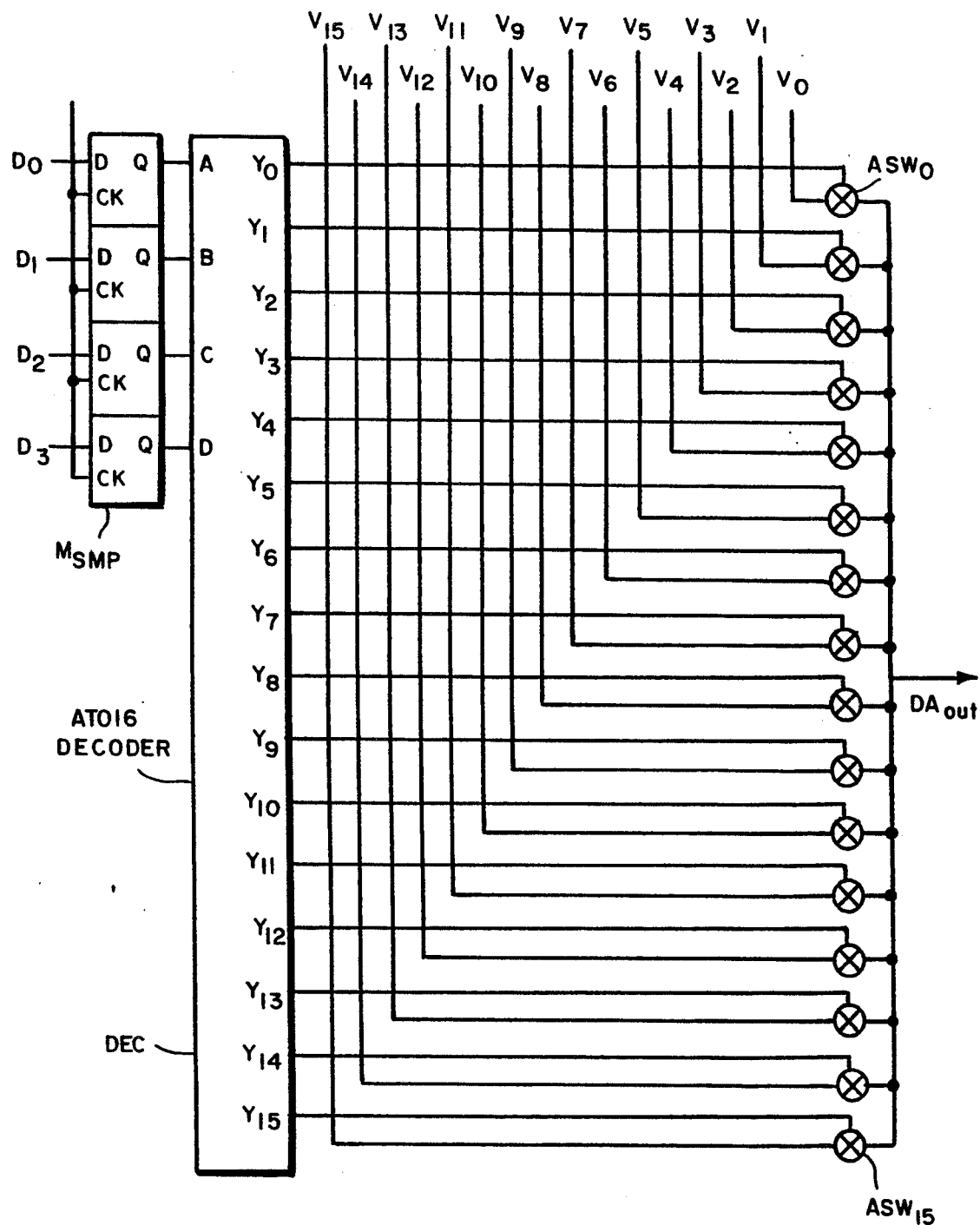
FIG. 12 is a circuit diagram showing the configuration of a DA circuit for 4-bit digital video signal data.

In the circuits shown in FIGS. 1 and 4, the digital video signal is a 2-bit data, for the convenience of the explanation. The configuration of a DA circuit to which digital video data of 4 bits is supplied is shown in FIG. 12. In this case, the number of gray-scale levels of the display can be increased. According to the number of bits of the data, a sampling memory $M_{SMP}$ comprises four flip-flops, and the required levels of external voltage is $2^4 = 16$. This may cause the decoder DEC to become large (4 inputs and 16 outputs). However, after one of the external voltages $V_x$ selected by analog switches $ASW_0$–$ASW_{15}$ is output as an output $DA_{out}$, the circuit operates in the same manner as in the circuits of FIGS. 1 and 4.

Figure 20:
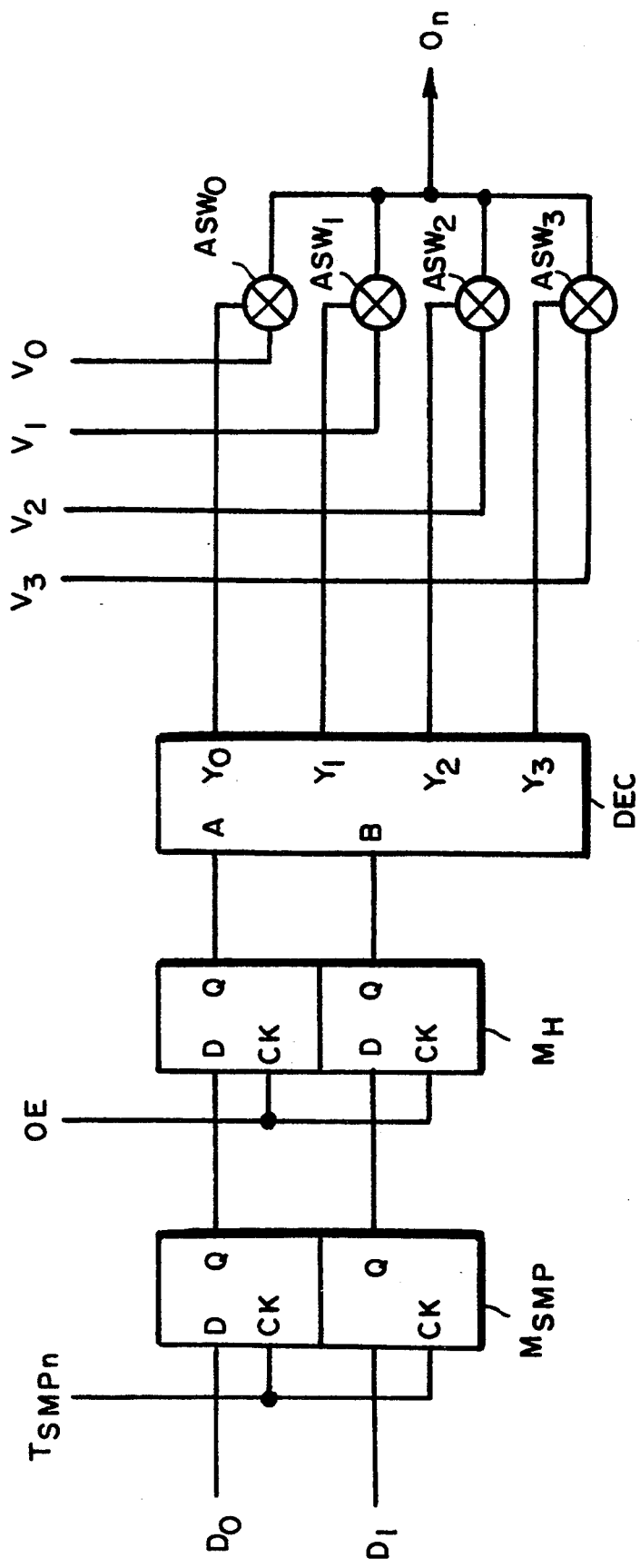
FIG. 20 is a circuit diagram showing a portion of one source line in the drive circuit of FIG. 19.

When the number of bits of the digital video signal data is further increased, the sampling memory $M_{SMP}$ becomes larger merely in proportion, but the numbers of output terminals of the decoder DEC, external voltage sources and the analog switches ASW are drastically increased by the power of 2. In the drive circuit shown in FIG. 19 or 20, since the sampling memory $M_{SMP}$, decoder DEC, etc. are provided for every source line, the numbers are further drastically increased (in the case of FIG. 19, the number becomes 120 fold), so that the LSI chip is extremely difficult to produce. However, in the drive circuit according to the invention, though the DA circuit including the sampling memory $M_{SMP}$, decoder DEC, etc. become larger as described above, the number of DA circuits is much smaller than that of source lines, such as one, two (FIG. 7), three (FIG. 8), or four (FIG. 10). Therefore, the drive circuit of the invention has a configuration in which the increase in the number of bits of the digital video signal data can be sufficiently tolerated.

Figure 7:
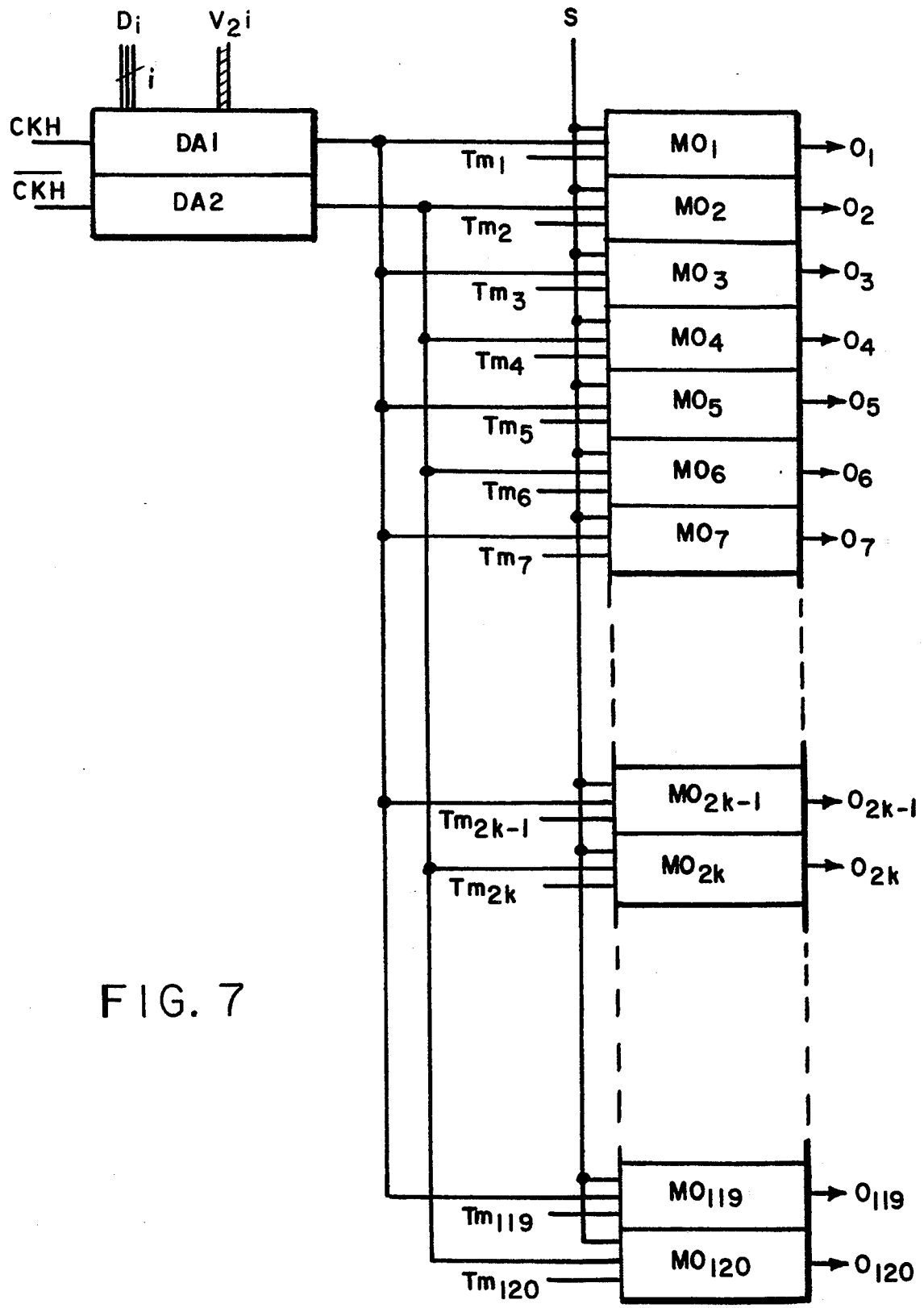
FIG. 7 is a block diagram showing the circuit of FIG. 4 in a simplified manner.
Figure 15:
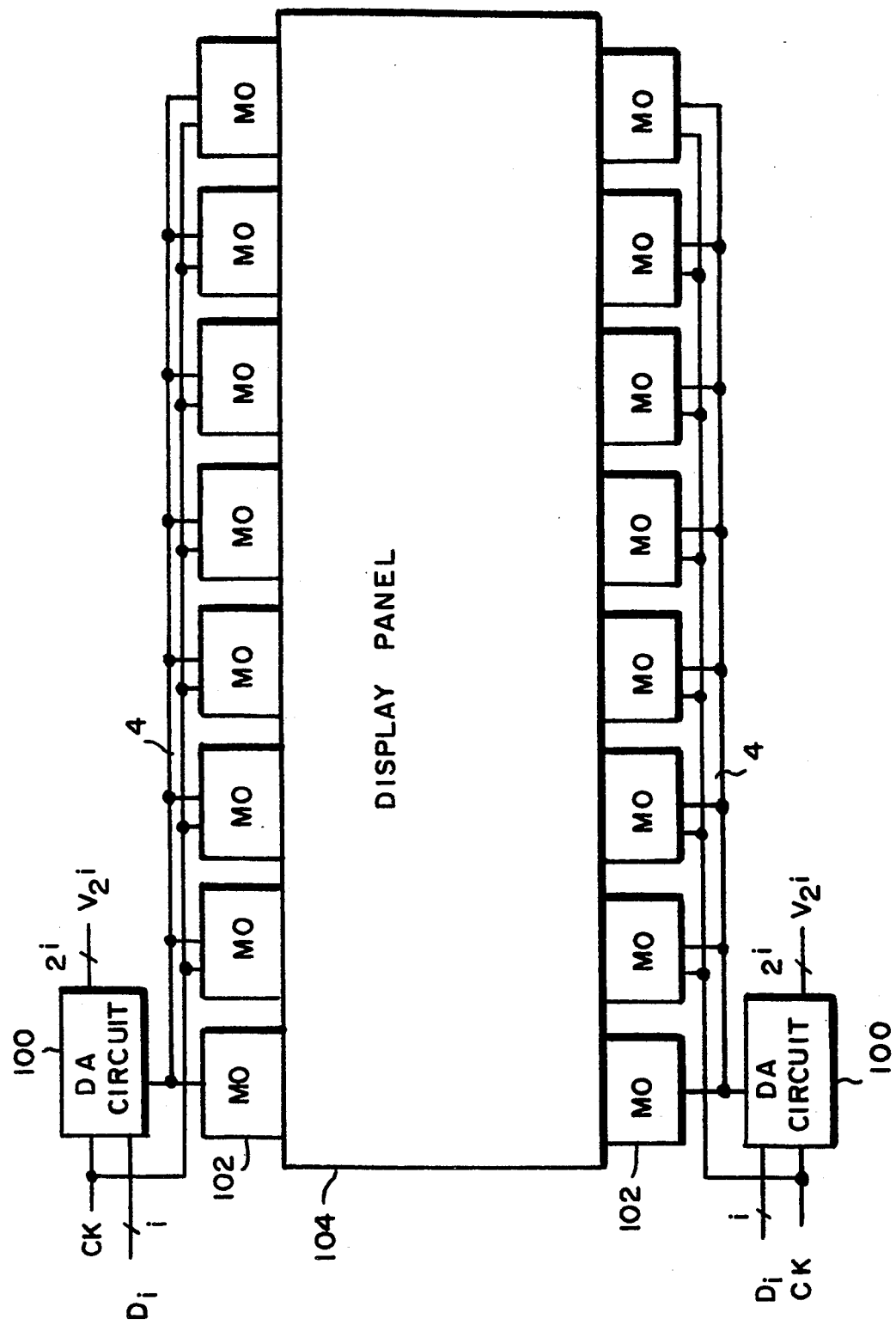
FIG. 15 is a plan view showing a liquid crystal panel having a drive circuit according to the invention.
Figure 16:
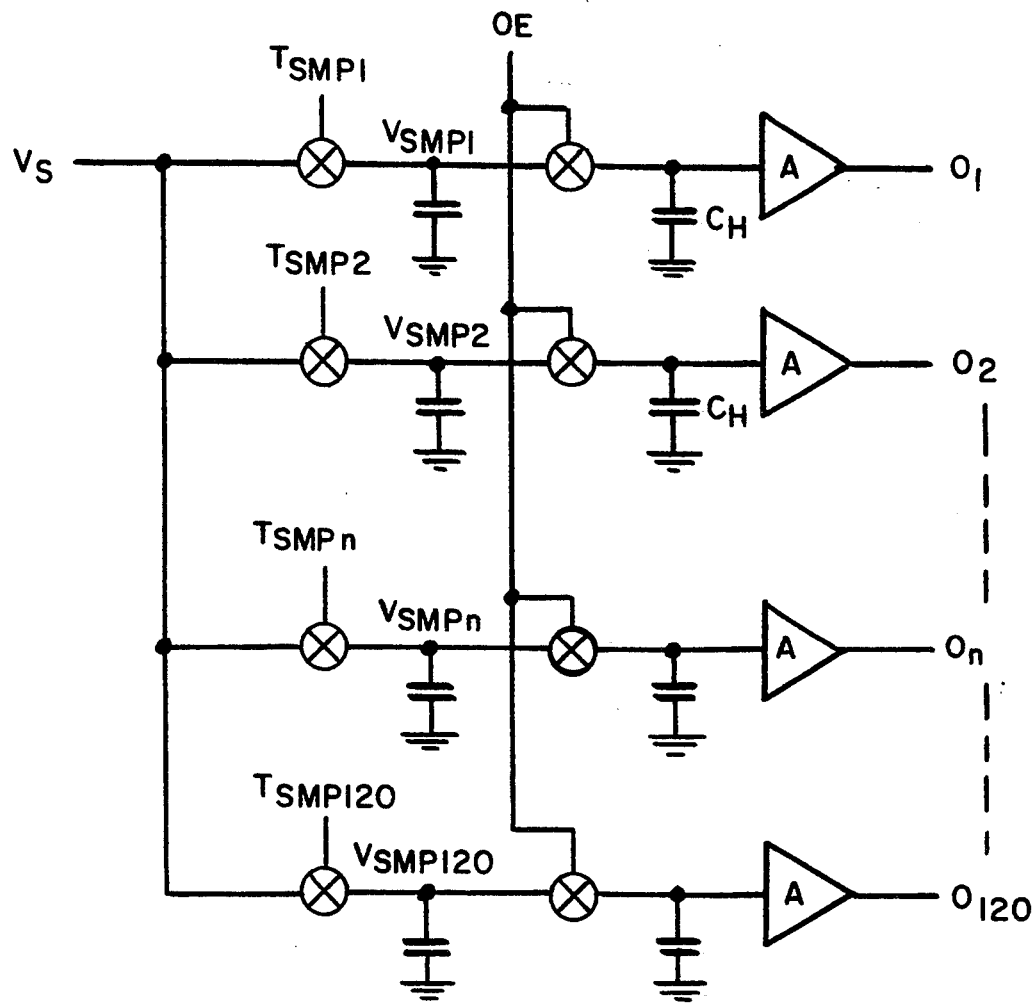
FIG. 16 is a circuit diagram showing a drive circuit for analog video signals.

As seen from the block diagram of FIGS. 3 or 7, in the drive circuit of the invention, the DA circuit for converting the digital data into voltages, and the signal voltage hold circuits $MO_i$ for temporarily holding and outputting the signal voltages are separately provided. The DA circuit has no relation to the number of the source lines (i.e., the pixels in one horizontal line), and the signal voltage hold circuit portion has no relation to the bit number of data. FIG. 15 shows a display apparatus which is constructed in such a manner that DA circuit portions 100 and signal voltage hold circuit portions (MO) 102 are separately formed in different LSIs and positioned around a liquid crystal panel 104. If the liquid crystal panel 104 is a TFT liquid crystal display of 640 dots, it is necessary to mount 16 signal voltage hold circuit portions 102 including 120 signal voltage hold circuits, in order to output signal voltages to source lines of 640×3 (RGB)=1920. When the DA circuit portions 100 are constructed in the form of a gate array, 1000 or less gates will be required order to accommodate 6-bit video signal data and four DA circuits (FIG. 10).

In this invention, digital video signal data are first converted into analog voltage signals, and then the signal voltages are sequentially output to respective capacities for holding signal voltages in accordance with selection pulses, in the same manner as in the prior art analog drive circuit. Therefore, since the external voltage source is connected only to the selected pixels, the loads for the external voltage source can be made very small. Accordingly, even when the number of pixels is increased with the increase in size and the improvement in resolution of the display apparatus, the capacitance of the external voltage sources can still be extremely small. In the circuit of the invention, since a digital sampling circuit is not provided for each pixel, the numbers of flip-flops, decoders and the like are still small, even if the number of pixels is increased. Moreover, even if the number of bits of the digital video signal data is increased, the number of flip-flops, decoders and the like which become larger in size is small. Therefore, if the size is increased and the resolution is improved in the display apparatus, the chip size can be prevented from being drastically enlarged.

Furthermore, by providing a plurality of circuits for selectively outputting an external voltage based on the digital video signal data, the external voltage can be supplied to the capacitor of each signal voltage hold circuit for a longer time period than the duration of the digital video signal data. Therefore, the drive circuit can be sufficiently used in a display apparatus with high resolution which the duration of the video signal is short.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A drive circuit for a display apparatus into which a digital video signal is input and in which a plurality of parallel signal electrodes are provided, said circuit comprising:

voltage supplying means for supplying a plurality of signal voltages, the levels of said signal voltages being different;

voltage selecting means, connected to said voltage supplying means, for receiving said digital video signal, for selecting one of said signal voltages in accordance with said digital video signal, and for supplying said selected signal voltage;

signal voltage means provided for each of said signal electrodes, and each having a plurality of signal lines for receiving selected signal voltages from said voltage selecting means, each of said signal lines being provided with a signal input switching element, a signal holding capacitor and a signal output switching element;

selection signal generating means for generating selection signals, each of said selection signals having a first on-state and a first off-state, said selection signals sequentially becoming said first on-state, said first on-state being a state in which said selected signal voltages from said voltage selecting means are sequentially accepted, said first off-state being a state in which said selected signal voltages from said voltage selecting means are sequentially accepted, said first off-state being a state in which said selected signal voltages are not accepted at all, said selection signal generating means being connected to said signal input switching elements of said plurality of signal lines in each of said signal voltage means, respectively;

control signal generating means for generating control signals by which a second on-state and a second off-state are alternately repeated, said second off-state being a state in which said accepted voltages are output to said signal electrodes, said second on-state being a state in which said accepted voltages are not output, said control signal output switching elements of said plurality of signal lines in each of said voltage means, respectively; and wherein each of said plurality of signal lines consists of a pair of signal lines, each of said pair of signal lines including said signal input switching element, said signal holding capacitor and said signal output switching element.

2. A drive circuit according to claim 1, wherein said drive circuit comprises a predetermined number of said voltage selecting means, said predetermined number being greater than one, and each of said voltage selecting means is connected to said signal voltage means corresponding to signal electrodes at substantially every one of said predetermined number, and said selection signal generating means generates selection signals by which said signal input switching elements are closed for a period which continues approximately said predetermined number of times as long as the duration of said digital video signal.

3. A drive circuit according to claim 1, wherein said signal holding capacitor is connected between said signal input switching element and said signal output switching element.

4. A drive circuit for a display apparatus into which a digital video signal is input and in which a plurality of parallel signal electrodes are provided, said circuit comprising:

voltage supplying means for supplying a plurality of signal voltages, the levels of said signal voltages being different;

voltage selecting means, connected to said voltage supplying means, for receiving said digital video signal, for selecting one of said signal voltages in accordance with said digital video signal, and for supplying said selected voltage as an output;

signal voltage means for each of said signal electrodes, each of said signal voltage means comprising a plurality of signal lines for independently coupling the output of said voltage selecting means to said signal electrode, each of said signal lines comprising an input means for selectively sampling and holding the output of said voltage selecting means as a function of a first control signal, and an output means for selectively coupling the contents of said input means to said signal electrode as a function of a second control signal;

control signal generating means for providing said first and second control signals to said signal voltage means, whereby a corresponding one of said plurality of signal lines in each of said signal voltage means is operative to couple the contents of said corresponding input means to said electrodes by way of the respective output means, while a sequence of said selected signal voltages from said voltage selecting means is sampled by the input means of a corresponding another of said plurality of signal lines in each of said signal voltage means, with each of said input means sampling a respective selected signal voltage in said sequence; and wherein each of said plurality of signal lines consists of a pair of signal lines, each of said pair of signal lines including a signal input switching element and a signal holding capacitor as said input means and a signal output switching element as said output means.

5. A drive circuit according to claim 4, wherein said drive circuit comprises a predetermined number of said voltage selecting means, said predetermined number being greater than one, and the respective output of each of said voltage selecting means is connected to said signal voltage means corresponding to signal electrodes at substantially every one of said predetermined number, and said control signal generating means generates said first control signal whereby said input circuits are operative to sample the respective outputs for a period which continues approximately said predetermined number of times as long as the duration of said digital video signal.

6. A drive circuit for a display apparatus into which a digital video signal is input and in which a plurality of parallel signal electrodes are provided, said circuit comprising:

means for receiving a plurality of signal voltages, the levels of said signal voltages being different;

voltage selecting means, connected to said means for receiving, for receiving said digital video signal, for selecting one of said signal voltages in accordance with said digital video signal, and for supplying said selected signal voltage;

signal voltage means provided for each of said signal electrodes, each having a plurality of signal lines for receiving selected signal voltages from said voltage selecting means, each of said signal lines including a signal input switching element;

selection signal means responsive to a control input for providing selection signals to said input switching elements in each of said plurality of signal lines whereby in a first phase said selected signal voltages from said voltage selections means are accepted sequentially by one of said signal lines in each of said plurality of signal lines and held in the corresponding signal holding capacitor while another of said signal lines in each of said plurality of signal lines does not accept said selected signal voltages, and for providing selection signals to said input switching elements in a second phase in which said selected signal voltages are accepted sequentially by said another of said signal lines in each of said plurality of signal lines and held in the corresponding signal holding capacitor while said one of said signal lines in each of said plurality of signal lines does not accept said selected signal voltages;

control signal means responsive to said control input for providing control signals to said signal output switching elements in said first phase whereby a voltage held in the signal holding capacitor of said voltage held in the signal holding capacitor of said one of said signal lines is not output to a respective one of said signal electrodes while a voltage held in said signal holding capacitor of said another of said signal lines is output to said respective signal electrode, and for providing control signals to said signal output switching elements in said second phase whereby said voltage held in the signal holding capacitor of said one of said signal lines is output to said respective signal electrode while voltage held in said signal holding capacitor of said another of said signal lines is not output to said respective signal electrode;

wherein said first and second phases are alternately repeated as a function of said control input and each of said plurality of signal lines consists of a pair of signal lines, each of said pair of signal lines including said signal input switching element, said signal holding capacitor and said signal output switching element.

7. A drive circuit for a display apparatus into which a digital video signal is input and in which a plurality of parallel signal electrodes are provided, said circuit comprising:

means for receiving a plurality of signal voltages, the levels of said signal voltages being different;

voltage selecting means, connected to said means for receiving, for receiving said digital video signal, for selecting one of said signal voltages in accordance with said digital video signal, and for supplying said selected signal voltage as an output;

signal voltage means for each of said signal electrodes, each of said signal voltage means comprising a plurality of signal lines for independently coupling the output of said voltage selecting means to said signal electrode, each of said signal lines comprising an input means for selectively sampling and holding the output of said voltage selecting means as a function of a first control signal, and an output means for selectively coupling the contents of said input means to said signal electrodes as a function of a second control signal;

control signal means for providing said first and second control signals to said signal voltage means in response to a control input, whereby a corresponding one of said plurality of signal lines in each of said signal voltage means is operative to couple the contents of said corresponding input means to said electrodes by way of the respective output means, while a sequence of said selected signal voltages from said voltage selecting means is sampled by the input means of a corresponding another of said plurality of signal lines in each of said signal voltage means, with each of said input means sampling a respective selected signal voltage in said sequence; and wherein each of said plurality of signal lines consists of a pair of signal lines, each of said pair of signal lines including a signal input switching element and a signal holding capacitor as said input means and a signal output switching element as said output means.

* * * * *

UNITED STATES PATENT AND TRADEMARK OFFICE
CERTIFICATE OF CORRECTION

PATENT NO. : 5,367,314

DATED : November 22, 1994

INVENTOR(S) : Okada et al.

It is certified that error appears in the above-identified patent and that said Letters Patent is hereby corrected as shown below:

Column 5, line 66, change "date" to --data--.

Column 5, line 67, change "a and B" to --A and B--.

Column 10, line 37, change "M)$_1$ - MO$_{120}$" to --MO$_1$ - MO$_{120}$--.

Column 16, line 3, delete "voltage held in the signal holding capacitor of said".

Signed and Sealed this

Twenty-eight Day of March, 1995

Attest:

BRUCE LEHMAN

*Attesting Officer*  *Commissioner of Patents and Trademarks*